(12) United States Patent
Szczeszynski

(10) Patent No.: US 11,936,291 B2
(45) Date of Patent: Mar. 19, 2024

(54) CONTROLLING CHARGE-BALANCE AND TRANSIENTS IN A MULTI-LEVEL POWER CONVERTER

(71) Applicant: pSemi Corporation, San Diego, CA (US)

(72) Inventor: Gregory Szczeszynski, Hollis, NH (US)

(73) Assignee: pSemi Corporation, San Diego, CA (US)

(*) Notice: Subject to any disclaimer, the term of this patent is extended or adjusted under 35 U.S.C. 154(b) by 168 days.

(21) Appl. No.: 17/560,767

(22) Filed: Dec. 23, 2021

(65) Prior Publication Data

US 2023/0148059 A1    May 11, 2023

Related U.S. Application Data

(60) Provisional application No. 63/276,923, filed on Nov. 8, 2021.

(51) Int. Cl.
*H02M 3/07* (2006.01)
*H02M 3/158* (2006.01)
(Continued)

(52) U.S. Cl.
CPC ............. *H02M 3/07* (2013.01); *H02M 3/158* (2013.01); *H02M 7/4833* (2021.05); *H02M 7/4837* (2021.05); *H02M 1/0095* (2021.05)

(58) Field of Classification Search
CPC .... H02M 3/07; H02M 7/4833; H02M 1/0095; H02M 3/155–1588; H02M 7/4837
See application file for complete search history.

(56) References Cited

U.S. PATENT DOCUMENTS

| 4,257,087 A | * | 3/1981 | Cuk | H02M 3/005 363/16 |
| 4,654,769 A | * | 3/1987 | Middlebrook | H02M 3/158 363/16 |

(Continued)

FOREIGN PATENT DOCUMENTS

| CN | 110545040 | 12/2019 |
| CN | 111697821 | 9/2020 |
| WO | 2023/081610 | 5/2023 |

OTHER PUBLICATIONS

Giuliano, David, "Multi-Level Structures and Methods for Switched-Mode Power Supplies", patent application filed in the USPTO on Dec. 22, 2021, U.S. Appl. No. 17/559,945, 74 pgs.

(Continued)

*Primary Examiner* — Yusef A Ahmed
(74) *Attorney, Agent, or Firm* — JAQUEZ LAND GREENHAUS & McFARLAND LLP; John Land, Esq.

(57) ABSTRACT

Circuits and methods that more effectively and efficiently solving the charge-balance problem for multi-level converter circuits by establishing a control method that selects an essentially optimal pattern or set of switch states that moves the fly capacitors towards a charge-balance state or maintains the current charge state every time a voltage level at an output node is selected regardless of what switch state or states were used in the past. Accordingly, multi-level converter circuit embodiments of the invention are free to select a different switch state or output voltage level every switching cycle without needing to keep track of any prior switch state or sequence of switch states. Additional benefits include improved transient performance made possible by the novel charge-balance method.

12 Claims, 18 Drawing Sheets

(51) Int. Cl.
*H02M 7/483* (2007.01)
*H02M 1/00* (2006.01)

(56) References Cited

U.S. PATENT DOCUMENTS

| | | | | |
|---|---|---|---|---|
| 4,720,668 A * | 1/1988 | Lee | | H02M 3/155 |
| | | | | 323/235 |
| 5,969,484 A * | 10/1999 | Santi | | H05B 41/28 |
| | | | | 315/307 |
| 6,294,900 B1 * | 9/2001 | Greenwood | | H02M 3/005 |
| | | | | 323/222 |
| 6,304,460 B1 * | 10/2001 | Cuk | | H02M 1/34 |
| | | | | 363/16 |
| 8,159,200 B2 * | 4/2012 | Lesso | | H02M 3/158 |
| | | | | 323/271 |
| 9,160,232 B2 | 10/2015 | Thomas et al. | | |
| 9,337,732 B2 | 5/2016 | Kondou | | |
| 9,571,006 B2 * | 2/2017 | Stahl | | H02M 7/53871 |
| 9,641,071 B2 * | 5/2017 | Logiudice | | H02M 3/157 |
| 9,748,841 B2 | 8/2017 | Granato | | |
| 9,899,918 B2 | 2/2018 | Lee | | |
| 10,090,763 B1 * | 10/2018 | Mercer | | H02M 3/1582 |
| 10,523,121 B2 * | 12/2019 | Zhao | | H02M 3/07 |
| 10,547,241 B1 * | 1/2020 | Li | | H02M 3/158 |
| 10,686,367 B1 * | 6/2020 | Low | | H02M 1/36 |
| 10,720,842 B1 * | 7/2020 | Wu | | H02M 3/1584 |
| 10,720,843 B1 * | 7/2020 | Wu | | H02M 3/1584 |
| 10,770,974 B2 * | 9/2020 | Wu | | G05F 1/577 |
| 10,992,226 B1 | 4/2021 | Aboueldahab et al. | | |
| 11,362,587 B2 | 6/2022 | Lazaro et al. | | |
| 11,522,466 B1 * | 12/2022 | Li | | H02M 7/4837 |
| 11,646,665 B2 * | 5/2023 | Wu | | H02M 1/0045 |
| | | | | 327/109 |
| 11,695,333 B2 * | 7/2023 | Rentmeister | | H02M 3/07 |
| | | | | 363/59 |
| 2006/0087295 A1 * | 4/2006 | Jang | | H02M 3/1584 |
| | | | | 323/222 |
| 2009/0001955 A1 * | 1/2009 | Yoshida | | H02M 3/158 |
| | | | | 323/282 |
| 2009/0059630 A1 * | 3/2009 | Williams | | H02M 3/1588 |
| | | | | 363/60 |
| 2009/0189393 A1 * | 7/2009 | Tyagi | | H02P 9/48 |
| | | | | 322/17 |
| 2010/0052050 A1 | 3/2010 | Lofti et al. | | |
| 2010/0259240 A1 * | 10/2010 | Cuk | | H02M 1/4258 |
| | | | | 323/299 |
| 2011/0057640 A1 * | 3/2011 | Cuk | | H02M 3/155 |
| | | | | 323/311 |
| 2012/0194164 A1 * | 8/2012 | Logiudice | | H02M 3/156 |
| | | | | 323/312 |
| 2012/0262967 A1 * | 10/2012 | Cuk | | H02M 7/4807 |
| | | | | 363/131 |
| 2012/0268969 A1 * | 10/2012 | Cuk | | H02M 7/48 |
| | | | | 363/37 |
| 2013/0088211 A1 * | 4/2013 | Radtke | | H02M 3/005 |
| | | | | 323/282 |
| 2014/0232364 A1 * | 8/2014 | Thomas | | H02M 7/4833 |
| | | | | 323/271 |
| 2014/0266135 A1 * | 9/2014 | Zhak | | H02M 3/07 |
| | | | | 323/311 |
| 2014/0293667 A1 * | 10/2014 | Schroeder | | H02M 7/4833 |
| | | | | 363/60 |
| 2014/0339899 A1 * | 11/2014 | Takizawa | | H02M 7/4837 |
| | | | | 307/63 |
| 2015/0002214 A1 * | 1/2015 | Englekirk | | H02M 3/07 |
| | | | | 327/536 |
| 2015/0003127 A1 | 1/2015 | Takizawa | | |
| 2015/0230302 A1 * | 8/2015 | Ito | | H05B 45/3725 |
| | | | | 315/77 |
| 2015/0280608 A1 * | 10/2015 | Yoscovich | | H02M 7/4833 |
| | | | | 363/131 |
| 2016/0118817 A1 * | 4/2016 | Uno | | H02M 3/005 |
| | | | | 320/166 |
| 2016/0197552 A1 * | 7/2016 | Giuliano | | H02M 3/07 |
| | | | | 363/60 |
| 2017/0310105 A1 * | 10/2017 | Shen | | H02M 7/4837 |
| 2018/0026518 A1 * | 1/2018 | Liu | | H02M 1/088 |
| | | | | 323/312 |
| 2018/0062507 A1 * | 3/2018 | Giuliano | | H02M 3/07 |
| 2018/0123341 A1 * | 5/2018 | Lehn | | H02M 1/15 |
| 2018/0131281 A1 * | 5/2018 | Inoue | | H02M 3/285 |
| 2019/0109530 A1 * | 4/2019 | Perreault | | H02M 1/083 |
| 2019/0115830 A1 * | 4/2019 | Giuliano | | H02M 3/158 |
| 2019/0199221 A1 * | 6/2019 | Zhao | | H02M 3/33573 |
| 2019/0379287 A1 * | 12/2019 | Zhang | | H02M 3/07 |
| 2020/0228014 A1 * | 7/2020 | Wu | | G05F 1/577 |
| 2020/0228015 A1 * | 7/2020 | Wu | | H02M 3/158 |
| 2020/0228016 A1 * | 7/2020 | Wu | | H02M 1/08 |
| 2020/0243744 A1 * | 7/2020 | Chaput | | H02M 3/1582 |
| 2021/0067057 A1 * | 3/2021 | Abarzadeh | | H02M 7/4837 |
| 2021/0296983 A1 * | 9/2021 | Rentmeister | | H02M 1/0095 |
| 2021/0367430 A1 * | 11/2021 | Da Silva | | H02M 3/158 |
| 2021/0367532 A1 * | 11/2021 | Kidera | | H02M 7/4837 |
| 2022/0006382 A1 * | 1/2022 | Wu | | H02M 1/08 |
| 2022/0190712 A1 * | 6/2022 | Chen | | H02M 1/4225 |
| 2022/0190738 A1 * | 6/2022 | Chen | | H02M 1/007 |
| 2022/0224231 A1 * | 7/2022 | Rizzolatti | | H02M 1/0095 |
| 2022/0247310 A1 * | 8/2022 | Wittenbreder, Jr. | | H02M 3/07 |
| 2022/0321010 A1 * | 10/2022 | Bieber | | H02M 3/33561 |
| 2022/0376616 A1 * | 11/2022 | Hu | | H02M 3/07 |
| 2022/0416653 A1 | 12/2022 | Giuliano | | |
| 2022/0416664 A1 * | 12/2022 | Wu | | H02M 3/1584 |
| 2023/0083355 A1 * | 3/2023 | Bishnoi | | H02M 1/325 |
| | | | | 363/13 |
| 2023/0136027 A1 | 5/2023 | Szczeszynski et al. | | |
| 2023/0142335 A1 | 5/2023 | Szczeszynski et al. | | |

OTHER PUBLICATIONS

Szczeszynski, Gregory, "Protecting Multi-Level Power Converters", patent application filed in the USPTO on Dec. 23, 2021, U.S. Appl. No. 17/560,700, 50 pgs.

Szczeszynski, Gregory, "Improving Light-Load Recovery in a Multi-Level Converter", patent application filed in the USPTO on Dec. 23, 2021, U.S. Appl. No. 17/560,683, 52 pgs.

Zweizig, Jefferey Shawn, Office Action received from the USPTO dated Oct. 14, 2022 for U.S. Appl. No. 17/559,931, 11 pgs. ).

Wu, Gary, "Efficient Bootstrap Supply Generators for Multi-Level Power Converters", U.S. Patent application filed in the USPTO on Dec. 22, 2021 for U.S. Appl. No. 17/559,931, 67 pgs.

Madouroglou, E., International Search Report and Written Opinion received from the EPO dated Sep. 19, 2022, 14 pgs.

Meynard, et al., "Multi-Level Conversion: High Voltage Choppers and Voltage-Source Inverters", Proceedings of the Annual Power Electronics Specialists Conference, Toledo, Jun. 29-Jul. 3, 1992; Proceedings of the Annual Power Electronics Specialists Conference, New York, IEEE, US, vol. 1, Jun. 29, 1992, pp. 397-403.

Peng, Fang Zheng, "A Generalized Multilevel Inverter Topology with Self Voltage Balancing", IEEE Transactions on Industry Applications, IEEE Service Center, vol. 37, No. 2, Mar. 1, 2001, pp. 611-618.

Chen, et al., "Zero-Voltage-Switching PWM Hybrid Full-Bridge Three-Level Converter", IEEE Transactions on Power Electronics, Institute of Electrical and Electronics Engineers, vol. 20, No. 2, Mar. 1, 2005, pp. 395-404.

Lin, et al., "Interleaved Resonant Converter with the Balanced Flying Capacitors", IET Power Electronics, IET, UK, vol. 8, No. 3, Mar. 1, 2015, pp. 447-457.

Zweizig, Jefferey Shawn, Notice of Allowance received from the USPTO dated Dec. 28, 2022 for U.S. Appl. No. 17/559,931, 7 pgs).

Tiku, Sisay G., Office Action received from the USPTO dated Jul. 7, 2023 for U.S. Appl. No. 17/560,700, 17 pgs.

Zweizig, Jefferey Shawn, Office Action received from the USPTO dated Oct. 14, 22 for U.S. Appl. No. 17/559,931, 11 pgs. ).

Ahmed, Yusef A., Office Action received from the USPTO dated Feb. 1, 2023 for U.S. Appl. No. 17/559,945, 19 pgs.

(56) References Cited

OTHER PUBLICATIONS

Kellner, Alexandria, International Search Report and Written Opinion received from the EPO dated Feb. 2, 2023 for appln. No. PCT/US2022-078717, 12 pgs.
Da Rocha, et al., "Level Shifters and DCVSL for a Low-Voltage CMOS 4.2-V Buck Converter", IEEE Transactions on Industrial Electronics, vol. 55, No. 9, Sep. 2008, pp. 3315-3323.
Kruip, Stephan, International Search Report and Written Opinion received from the EPO dated Feb. 27, 2023 for appln. No. PCT/US2022/078918, 9 pgs.
Sepahvand, et al., "Start-Up Procedure and Switching Loss Reduction for a Single-Phase Flying Capacitor Active Rectifier", IEEE Transactions on Industrial Electronics, vol. 60, No. 9, Sep. 2013, pp. 3699-3710.
Kruip, Stephan, International Search Report and Written Opinion received from the EPO dated Feb. 28, 2023 for appln. No. PCT/US2022/078920, 10 pgs.
Yuan, et al., "Self-Balancing of the Clamping-Capacitor-Voltages in the Multilevel Capacitor-Clamping-Inverter under Sub-Harmonic PWM Modulation", IEEE Transactions on Power Electronics, vol. 16, No. 2, Mar. 2001, pp. 256-263.
Jia, et al., "Active Power Decoupling for a Modified Modular Multilevel Converter to Decrease Submodule Capacitor Voltage Ripples and Power Losses", IEEE Transactions on Power Electronics, vol. 36, No. 3, Mar. 2021, pp. 2835-2851.
Zou, et al., The Analysis of DC-DC Converter Topologies Based on Stackable Voltage Elements, The Ohio State University, IEEE 2010, pp. 4428-4433.

\* cited by examiner

200

CONTROLLING CHARGE-BALANCE AND TRANSIENTS IN A MULTI-LEVEL POWER CONVERTER

CROSS-REFERENCE TO RELATED APPLICATIONS— CLAIM OF PRIORITY

The present application claims priority to U.S. provisional Patent Application No. 63/276,923, filed on Nov. 8, 2021, for a "Controlling Charge-Balance and Transients in a Multi-Level Power Converter", which is herein incorporated by reference in its entirety.

BACKGROUND

(1) Technical Field

This invention relates to electronic circuits, and more particularly to power converter circuits, including DC-DC power converter circuits.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as a battery, solar cells, and rectified AC sources. Power converters which generate a lower output voltage level from a higher input voltage power source are commonly known as buck converters, so-called because the output voltage $V_{OuT}$ is less than the input voltage $V_{IN}$, and hence the converter is "bucking" the input voltage. Power converters which generate a higher output voltage level from a lower input voltage power source are commonly known as boost converters, because $V_{OuT}$ is greater than $V_{IN}$. Some power converters may be either a buck converter or a boost converter depending on which terminals are used for input and output. Some power converters may provide an inverted output.

One type of direct current power converter known as a multi-level power converter includes charge transfer capacitors as energy storage elements coupled by controlled switches so as to transfer charge from \TIN to $V_{OuT}$. Such charge transfer capacitors are commonly known as "fly capacitors" or "pump capacitors". Every time a fly capacitor is used (i.e., not bypassed), the electrical energy flowing through that fly capacitor generally will either charge it or discharge it. This creates a control problem: what configurations and in what order can the fly capacitors be switched while maintaining their average voltage? This is the charge-balance problem that multi-level converter circuits introduce—balancing charge on the fly capacitors in order to maintain their average voltage.

Determining a suitable charge-balance method can become exceedingly difficult as the complexity of a multi-level converter circuit increases. Most conventional control methods rely on establishing a sequence of linked state-changes to try to achieve charge balance. Control systems based on long sequences of switch states generally assume that all system variables—such as input voltage and output current—are constant during the sequence. This is unrealistic for a real-world environment, where all system variables tend to be dynamic.

Accordingly, there is a need for circuits and methods for more effectively and efficiently solving the charge-balance problem for multi-level converter circuits. The present invention addresses this and other needs.

SUMMARY

The present invention encompasses circuits and methods that more effectively and efficiently solving the charge-balance problem for multi-level converter circuits by establishing a control method that selects an essentially optimal pattern or set of switch states that moves the fly capacitors towards a charge-balance state or maintains the current charge state every time a voltage level at the Lx node is selected regardless of what switch state or states were used in the past. Accordingly, multi-level converter circuit embodiments of the invention are free to select a different switch state or Lx voltage level every switching cycle without needing to keep track of any prior switch state or sequence of switch states. Additional benefits include improved transient performance made possible by the novel charge-balance method.

In one embodiment, an M-level multi-level power converter includes: (1) an M-level converter circuit including (i) a set of switches series-coupled between a first voltage and a second voltage, and (ii) at least one fly capacitor coupled in series with certain respective switches and in parallel with switches in between the respective switches, each fly capacitor being coupled between a pair of low-side switches among the set of switches and between a pair of high-side switches among the set of switches, the converter circuit configured to receiving an input voltage on an input and produce an output voltage on an output, wherein the output voltage is different from the input voltage and wherein the output is configured to be coupled to a first terminal of an inductor; (2) a feedback controller coupled to a second terminal of the inductor and configured to produce a signal indicative of the voltage at the second terminal of the inductor; and (3) a multi-level controller coupled to the feedback controller and to the M-level converter circuit, and configured to receive at least the signal from the feedback controller and respective voltage status signals from the M-level converter circuit corresponding to the at least one fly capacitor.

The multi-level controller is configured to set an output level for the M-level multi-level converter circuit and charge-balance the at least one fly capacitor during a switching cycle of the M-level multi-level converter circuit in response to the received signals by: (1) selecting a fly capacitor that has not previously been selected; (2) if a voltage on the selected fly capacitor is above an associated target voltage and there are remaining low-side or high-side switches that can be closed to enable a discharge path for the selected fly capacitor, then (a) setting those switches that enable the discharge path for the selected fly capacitor to a closed state, and otherwise (b) setting those switches that enable a charging path for the selected fly capacitor to a closed state. Thereafter, the process loops to step (1) until all fly capacitors have been selected. For a remaining pair of left-over switches, the process includes setting an associated high-side switch or an associated low-side switch to a closed state based on a set of switch count rules.

The invention further encompasses an apparatus and a method for setting an output level and charge-balancing fly capacitors during a switching cycle of an M-level multi-level converter circuit that includes (1) a set of switches series-coupled between a first voltage and a second voltage, and (2) at least one fly capacitor coupled in series with certain respective switches and in parallel with switches in between the respective switches, where the apparatus and method generate a set of switch states for the set of switches that moves the at least one fly capacitor towards a charge-balance state or maintains a current charge state for the at least one fly capacitor when an output voltage level for the M-level multi-level converter circuit is selected, regardless of past switch states.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods that more effectively and efficiently solving the charge-balance problem for multi-level converter circuits by establishing a control method that selects an essentially optimal pattern or set of switch states that moves the fly capacitors towards a charge-balance state or maintains the current charge state every time a voltage level at the Lx node is selected regardless of what switch state or states were used in the past. Accordingly, multi-level converter circuit embodiments of the invention are free to select a different switch state or Lx voltage level every switching cycle without needing to keep track of any prior switch state or sequence of switch states. Additional benefits include improved transient performance made possible by the novel charge-balance method.

Multi-State Power Converters

Figure 1:
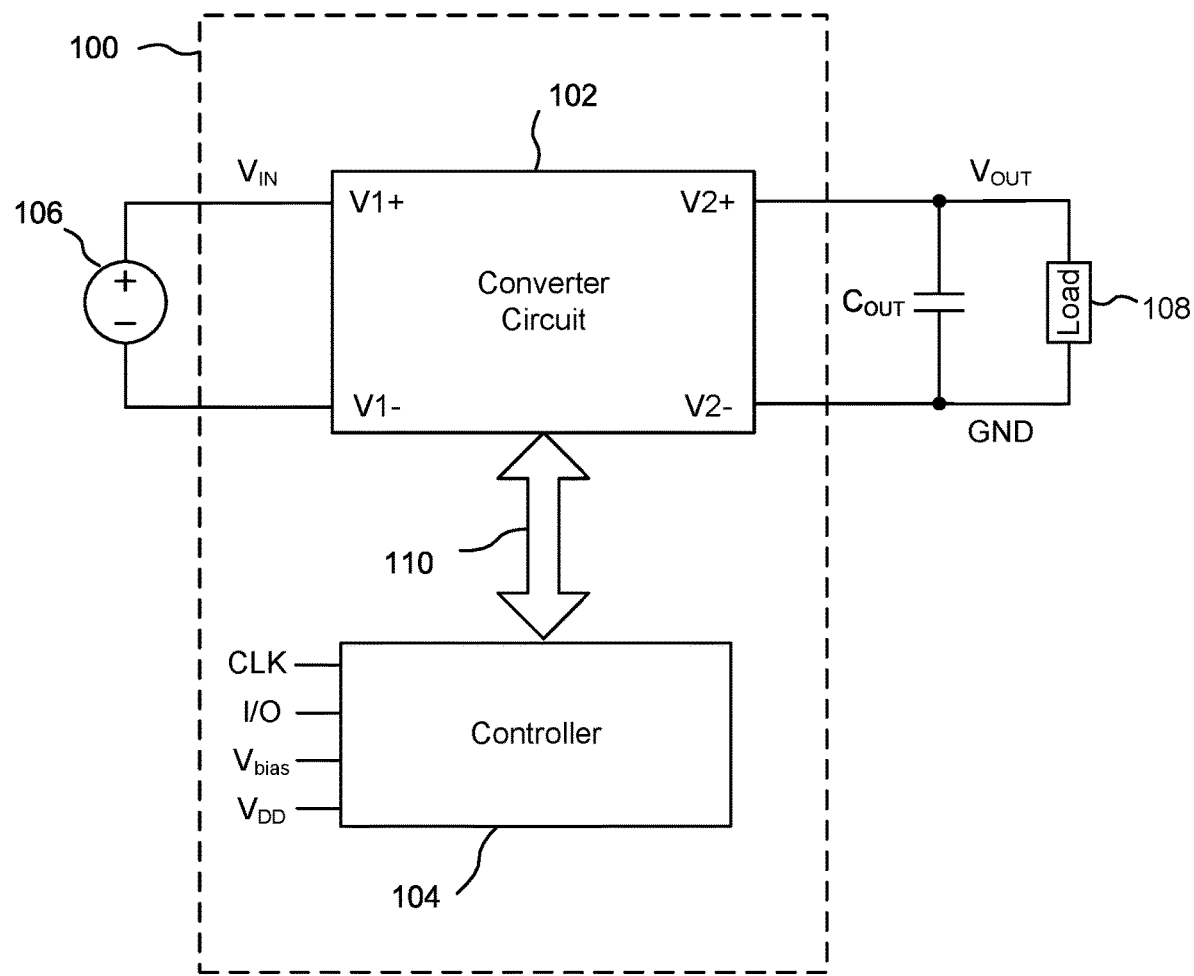
FIG. 1 is a block diagram of a circuit that includes a prior art power converter.

FIG. 1 is a block diagram of a circuit that includes a prior art power converter 100. In the illustrated example, the power converter 100 includes a converter circuit 102 and a controller 104. The converter circuit 102 is configured to receive an input voltage $V_{IN}$ from a voltage source 106 (e.g., a battery) across terminals V1+, V1−, and transform the input voltage $V_{IN}$ into an output voltage $V_{OUT}$ across terminals V2+, V2−. The output voltage $V_{OUT}$ is generally coupled across an output capacitor $C_{OuT}$, across which may be connected a load 108 (which also may be represented as an equivalent resistance). In some embodiments of the power converter 100, auxiliary circuitry (not shown), such as a bias voltage generator(s), a clock generator, a voltage control circuit, etc., may also be present and coupled to the converter circuit 102 and the controller 104.

The controller 104 receives a set of input signals and produces a set of output signals. Some of these input signals arrive along a signal path 110 connected to the converter circuit 102. These input signals carry information that is indicative of the operational state of the converter circuit 102. The controller 104 may also receive a clock signal CLK (for synchronous converter circuits 102) and one or more external input/output signals I/O that may be analog, digital (encoded or direct signal lines), or a combination of both. Based upon the received input signals, the controller 104 produces a set of control signals back to the converter circuit 102 on the signal path 110 that control the internal components of the converter circuit 102 (e.g., internal switches, such as low voltage FETs, especially MOSFETs) to cause the converter circuit 102 to boost or buck $V_{IN}$ to $V_{OuT}$. In some embodiments, an auxiliary circuit (not shown) may provide various signals to the controller 104 (and optionally directly to the converter circuit 102), such as the clock signal CLK, the input/output signals I/O, as well as various voltages, such as a general supply voltage $V_{DD}$ and a transistor bias voltage $V_{BIAS}$.

Figure 2A:
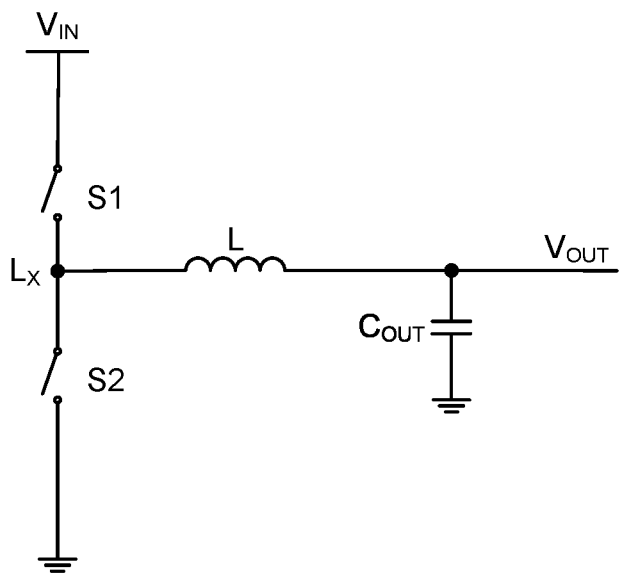
FIG. 2A is a schematic diagram of a prior art 2-level DC-to-DC buck converter circuit that may be used as the converter circuit of FIG. 1.

In some power converter designs, the converter circuit 102 uses an inductor as an energy storage element. For example, FIG. 2A is a schematic diagram of a prior art 2-level DC-to-DC buck converter circuit 200 that may be used as the converter circuit 102 of FIG. 1. A set of two switches, S1 and S2, is series-coupled between $V_{IN}$ and circuit ground (0V relative to $V_{IN}$). An optional inductor L is coupled to an output capacitor $C_{OuT}$ and to a node Lx between switches S1 and S2. The voltage across the output capacitor $C_{ouT}$ is $V_{OUT}$.

One function of the inductor L and the filter capacitor $C_{OuT}$ is energy transfer and storage. Part of the controller circuitry the converter circuit 102 generally includes a pulse-width modulation (PWM) duty cycle controller (not shown) coupled to control inputs of the switches S1, S2 (e.g., the gates of MOSFETs) to alternately enable (close or turn "ON") and disable (open or turn "OFF") the switches S1, S2 to control energy flow from to the load. The PWM duty cycle controller receives $V_{OUT}$ as a feedback voltage and a clock signal. The feedback voltage enables the PWM duty cycle controller to vary the duty cycle of a PWM control signal to the switches S1, S2 to offset changes in the load, thereby regulating $V_{OuT}$. The PWM duty cycle controller generally would be part of the controller 104 of FIG. 1 but may be a stand-alone circuit.

Figure 2B:
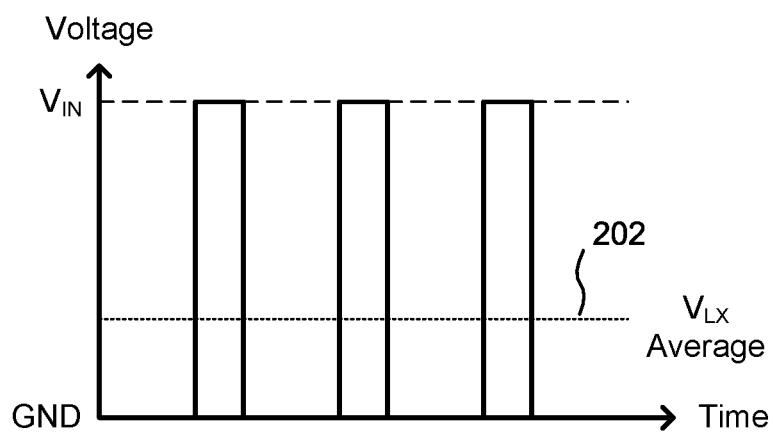
FIG. 2B is a graph showing the voltage level at Lx as a function of time for the circuit of FIG. 2A.

In the illustrated example, the converter circuit 200 switches between two switch states: S1 closed and S2 open (voltage level at Lx=$V_{IN}$), or S1 open and S2 closed (voltage level at Lx=GND). FIG. 2B is a graph showing the voltage level at Lx as a function of time for the circuit of FIG. 2A. Graph line 202 is the average voltage level at Lx as switches S1 and S2 toggle between the two available switch states. The PWM duty cycle controller sets the time in each switch state based on the voltage at $V_{OuT}$, which determines the amplitude of the average voltage at Lx (noting that, the average Lx voltage in theory is equal to the $V_{OUT}$ average voltage, but that, due to parasitics, the Lx average voltage is higher and/or lower (for negative currents) than the $V_{OUT}$ average). As can be appreciated by considering FIG. 2B, the inductor L sees large jumps in the voltage level at Lx, from GND to $V_{IN}$ and back to GND. The resulting voltage ripple across the inductor L necessitates a significant amount of filtering to smooth $V_{OUT}$.

An alternative way of reducing the voltage ripple across the inductor L is to add more series switches as well as charge transfer capacitors as energy storage elements to transfer charge from $V_{IN}$ to $V_{OuT}$. As noted above, such charge transfer capacitors are commonly known as "fly capacitors" or "pump capacitors" and may be external components coupled to an integrated circuit embodiment of a converter circuit. The presence of X fly capacitors Cx defines a multi-level capacitive converter circuit capable of generating M=X+2 voltage levels at node Lx from $2^{(x+1)}$ switch states.

Figure 3A:
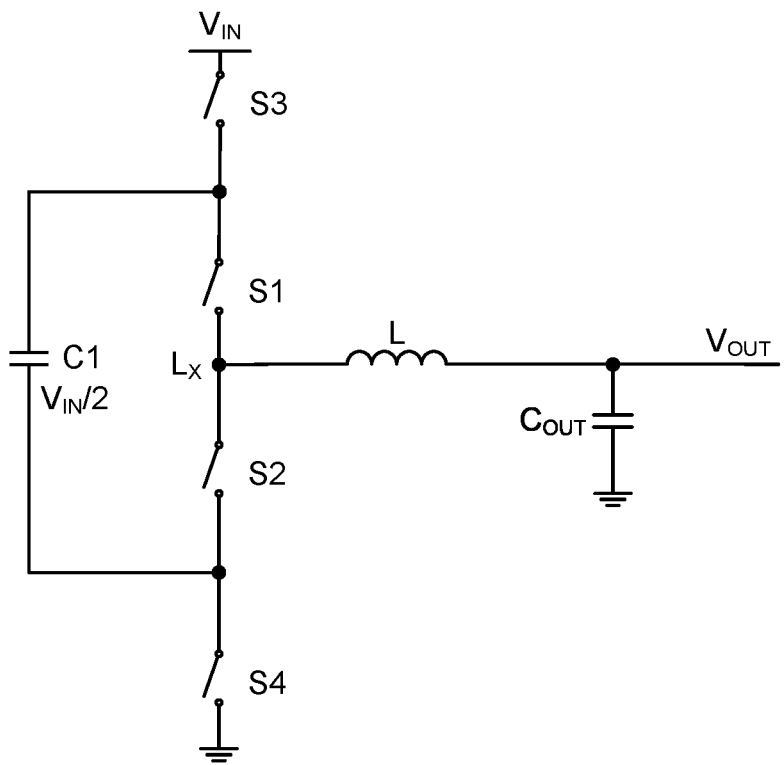
FIG. 3A is a schematic diagram of a prior art 3-level DC-to-DC buck converter circuit that may be used as the converter circuit of FIG. 1.

For example, FIG. 3A is a schematic diagram of a prior art 3-level DC-to-DC buck converter circuit 300 that may be used as the converter circuit 102 of FIG. 1. A set of four switches, S1-S4, is series-coupled between $V_{IN}$ and circuit ground. A fly capacitor C1 is coupled in series with switches S3 and S4, and in parallel with switches S1 and S2. An optional inductor L is coupled to an output capacitor $C_{OuT}$ and to a node Lx between switches S1 and S2, and again the voltage across the output capacitor $C_{OUT}$ is $V_{OUT}$.

In the illustrated example, the presence of the single (X=1) fly capacitor C1 in the converter circuit 200 enables four switch states that each generate one of three voltage levels at node Lx.

Figure 3F:
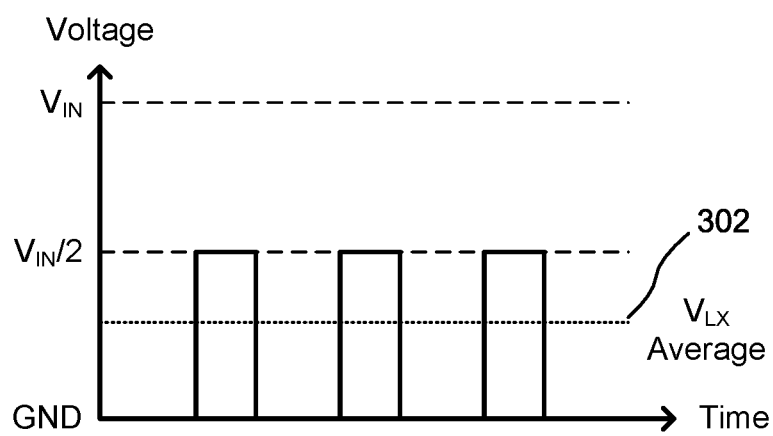
FIG. 3F is a graph showing the voltage level at Lx as a function of time for the circuit of FIG. 3A.
Figure 3B:
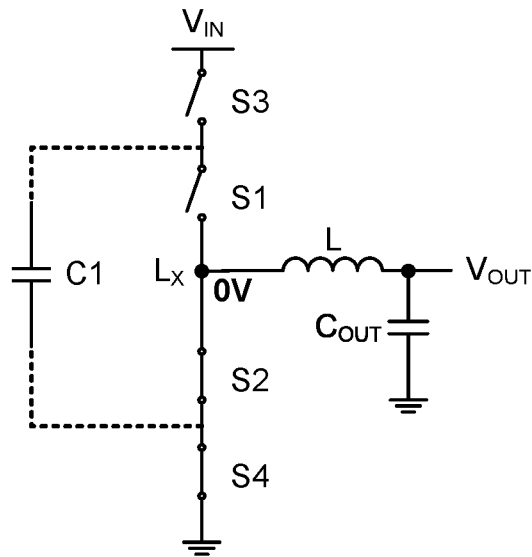
FIG. 3B is a schematic diagram of the converter circuit in a first switch state defining a Level-1 voltage level at the Lx node.

FIG. 3B is a schematic diagram of the converter circuit 300 in a first switch state defining a Level-1 voltage level at the Lx node. In this first switch state, S2 and S4 are closed and S1 and S3 are open, effectively bypassing C1 (indicated by dotted connection lines) and connecting Lx to circuit ground (voltage level at Lx=GND).

Figure 3C:
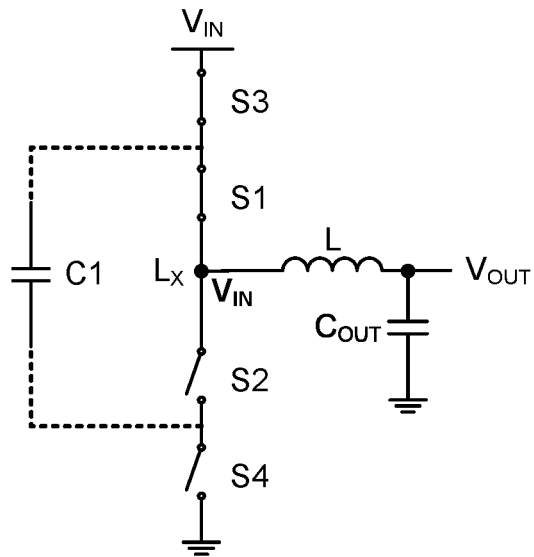
FIG. 3C is a schematic diagram of the converter circuit in a second switch state defining a Level-3 voltage level at the Lx node.

FIG. 3C is a schematic diagram of the converter circuit 300 in a second switch state defining a Level-3 voltage level at the Lx node. In this second switch state, S2 and S4 are open and S1 and S3 are closed, again effectively bypassing C1 and connecting Lx to $V_{IN}$ (voltage level at Lx=$V_{IN}$).

Figure 3D:
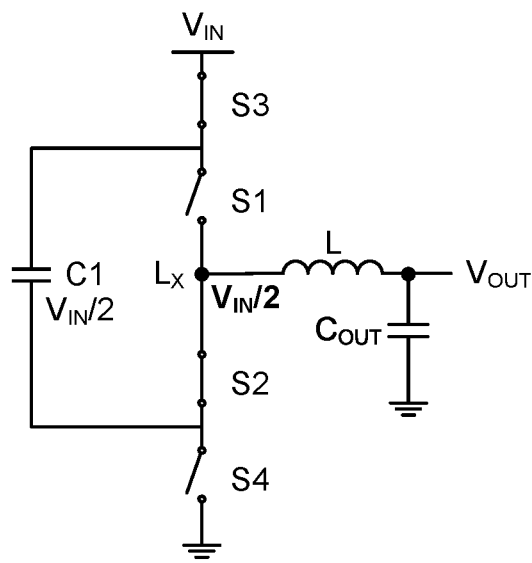
FIG. 3D is a schematic diagram of the converter circuit in a third switch state defining a Level-2 voltage level at the Lx node.

FIG. 3D is a schematic diagram of the converter circuit 300 in a third switch state defining a Level-2 voltage level at the Lx node. In this third switch state, S1 and S4 are open and S2 and S3 are closed, connecting C1 from $V_{IN}$ to Lx, and thus charging C1 with inductor L current flowing into a load. The voltage across C1 will be about $V_{IN}/2$ and the voltage level at Lx will also equal about $V_{IN}/2$.

Figure 3E:
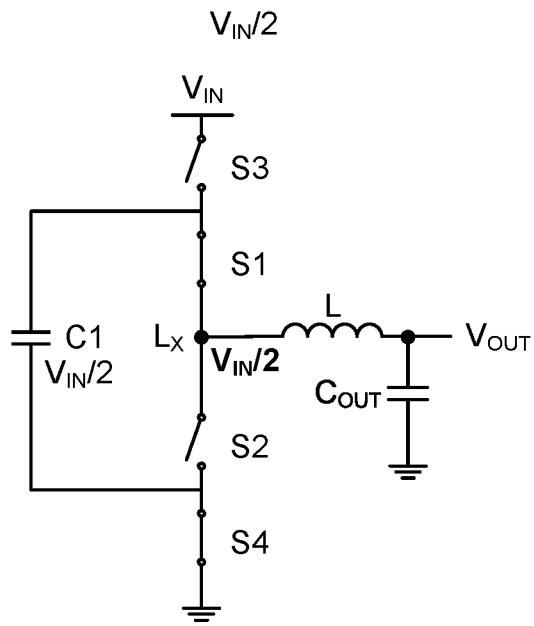
FIG. 3E is a schematic diagram of the converter circuit in a fourth switch state defining the Level-2 voltage level at the Lx node.

FIG. 3E is a schematic diagram of the converter circuit 300 in a fourth switch state defining the Level-2 voltage level at the Lx node. In this fourth switch state, S1 and S4 are closed and S2 and S3 are open, connecting C1 from Lx to GND and thus discharging C1 with inductor L current flowing from a load. The voltage across C1 will be about $V_{IN}/2$ and the voltage level at Lx will also equal about $V_{IN}/2$ (this assumes that C1 was previously charged in state three). Accordingly, the illustrated converter circuit 300 has two switch states that generate a Level-2 voltage level of $V_{IN}/2$ at the Lx node.

FIG. 3F is a graph showing the voltage level at Lx as a function of time for the circuit of FIG. 3A. Graph line 302 is the average voltage level at Lx as the switches S1-S4 cycle between GND and the two Level-2 switch states and has the same value as graph line 202 in FIG. 2B. As can be appreciated by considering FIG. 3F, if the converter circuit 300 is toggled between switch states three and four (avoiding switch state two that bypasses the fly capacitor C1), the inductor L sees much smaller jumps in the voltage level at Lx, going from GND (Level-1) to only $V_{IN}/2$ (Level-2) and back to GND. The resulting reduced voltage ripple across the inductor L necessitates much less filtering to smooth $V_{OUT}$.

Adding additional series switches Sx and fly capacitors Cx to the 2-level converter circuit 300 increases the number of switch states and resulting voltage levels between $V_{IN}$ and circuit ground that can be applied to the Lx node, thus generating an even smaller voltage ripple across the inductor L. This reduces the filtering requirements to get a smooth output voltage. For example, a 4-level DC-to-DC buck converter circuit includes 6 series-coupled switches S1-S6 and two fly capacitors Cx (X=2). Consequently, a 4-level converter circuit can define 4 voltage levels ($V_{IN}$, GND, $1/3V_{IN}$, and $2/3V_{IN}$) at node Lx from 8 switch states (3 switch states result in the $1/3V_{IN}$ level at Lx, and 3 other switch states result in the $2/3V_{IN}$ level at Lx). For some applications, $V_{OUT}$ is set low enough that the voltage level at node Lx alternates between GND and the next higher voltage level available. For higher output voltages, the switching pattern may never use GND. For example, in a 4-level converter circuit, an output $V_{OuT}$ set to $0.5*V_{IN}$ can be achieved by alternating the Lx node between $2/3V_{IN}$ and $1/3V$.

A different interpretation of a multi-level converter circuit is that the fly capacitors Cx create a charge-pump for the buck converter circuit 200 of FIG. 2A. A key difference is that, unlike a standard charge-pump where the output is restricted to one output, a multi-level converter circuit allows the fly capacitors Cx to be coupled to create multiple intermediate voltages. For the 4-level example, the two fly capacitors each act as a 1/3 charge-pump with the additional benefit that any input voltage that is a sum of 1/3 ratios can be created, including $V_{IN}$ and GND.

A multi-level converter circuit couples the fly capacitors Cx in different combinations in order to bring the voltage level at the Lx node down or up. As noted above, every time a fly capacitor is used (i.e., not bypassed), the electrical energy flowing through that fly capacitor generally will either charge it or discharge it, which creates a control problem: what configurations and in what order can the fly capacitors be switched while maintaining their average voltage?

Resolving the charge-balance problem so as to maintain an average voltage across the single capacitor in a 3-level converter circuit is relatively easy. For example, in a 3-level converter circuit, there is only one way to generate the Level-1 (GND) and Level-3 ($V_{IN}$) voltage levels at the Lx node (see FIGS. 3B and 3C, respectively)—the fly capacitors C1 is not used in for these Lx voltage levels. However, for the Level 2 ($V_{IN}/2$) voltage level at Lx, two separate switch states can be used: one switch state charges the capacitor (S3 and S2 closed, S1 and S4 open; see FIG. 3D) and the other switch state discharges the capacitor (S3 and S2 open, S1 and S4 closed; see FIG. 3E). The control of a 3-level converter circuit is thus fairly easy: every time the converter circuit switches states to Level-2, a controller can alternate between charging and discharging the single capacitor to maintain its voltage. A voltage comparator can be used to monitor the capacitor to help decide on a charging state or a discharging state. For instance, if the capacitor voltage is below $V_{IN}/2$, then a controller would select charge (the third switch state, shown in FIG. 3D), and if the capacitor voltage is above $V_{IN}/2$, then the controller would select discharge (the fourth switch state, shown in FIG. 3E).

A 4-level converter circuit (X=2) reveals the charge-balance difficulty when more capacitors are present. A Level-1 voltage level (GND) and a Level-4 voltage level ($V_{IN}$) at the Lx node are each determined by a single switch state. However, the Level-2 voltage level ($1/3V_{IN}$) and Level-3 voltage level ($2/3V_{IN}$) at Lx each can be achieved by any of three different switch states. At higher orders of a multi-level converter circuit (X>2), more switch states are possible for generating the intermediate levels between $V_{IN}$ and GND. The problem gets much worse with a 5-level converter circuit (X=3). A Level-1 voltage level (GND) and a Level-4 voltage level ($V_{IN}$) at the Lx node are each determined by a single switch state. However, the Level-2 voltage level ($1/4V_{IN}$) and Level-4 voltage level ($3/4V_{IN}$) at Lx each can be achieved by any of four different switch states, the Level-3 voltage level ($2/4V_{IN}$) at Lx each can be achieved by any of six different switch states.

As should be clear from these examples, determining a suitable charge-balance method can become exceedingly difficult as the complexity of a multi-level converter circuit increases. As previously noted, most conventional control methods rely on establishing a sequence of linked state-changes to try to achieve charge balance. Control systems based on long sequences of switch states generally assume that all system variables—such as input voltage and output current—are constant during the sequence. This is unrealistic for a real-world environment, where all system variables tend to be dynamic.

Control Capacitors

Figure 4A:
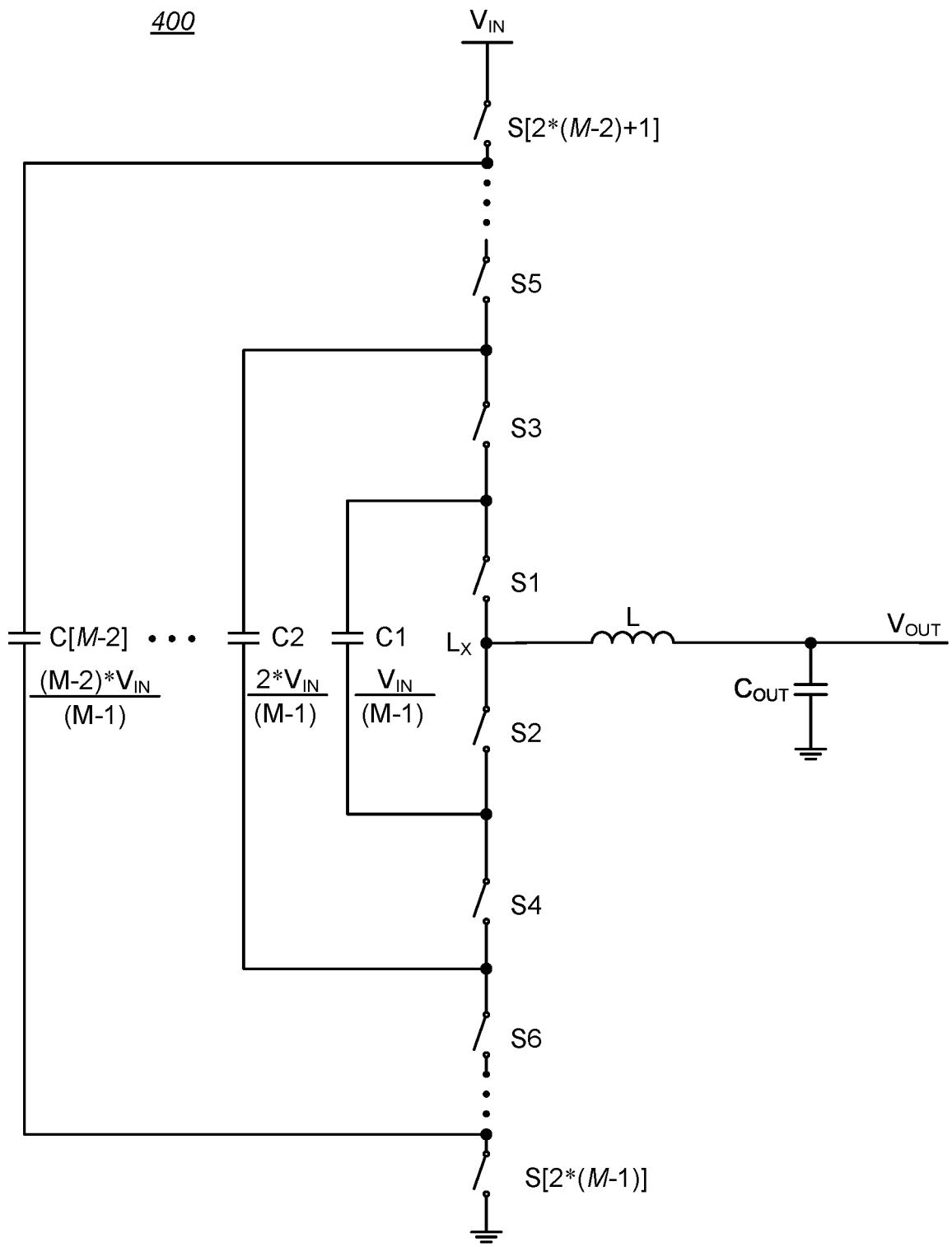
FIG. 4A is schematic diagram of a generalized M-level multi-level converter cell that may be used as the converter circuit of FIG. 1.

FIG. 4A is schematic diagram of a generalized M-level multi-level converter cell 400 that may be used as the converter circuit 102 of FIG. 1. A set of switches, S1-S[2*(M−1)], is series-coupled between $V_{IN}$ and circuit ground. The set of switches are organized in switch pairs: S1 & S2, S3 & S4, . . . S [2*(M−2)+1]& S [2*(M−1)]. A set of M−2 fly capacitor Cx is coupled in series with certain respective switches (see FIG. 4B), and in parallel with switches in between those switches. In terms of switch pairs, there are M−1 pairs of switches, or one more than the number of fly capacitors.

An optional inductor L is coupled to an output capacitor $C_{ouT}$ and to a node $L_x$ between switches S1 and S2, and again the voltage across the output capacitor $C_{OuT}$ is $V_{OuT}$. The inductor L doubles as a virtual current source that moves all charge between the fly capacitors Cx. This creates a very efficient form of charge transfer, but introduces the problem of charge-balancing the fly capacitors Cx.

Figure 4B:
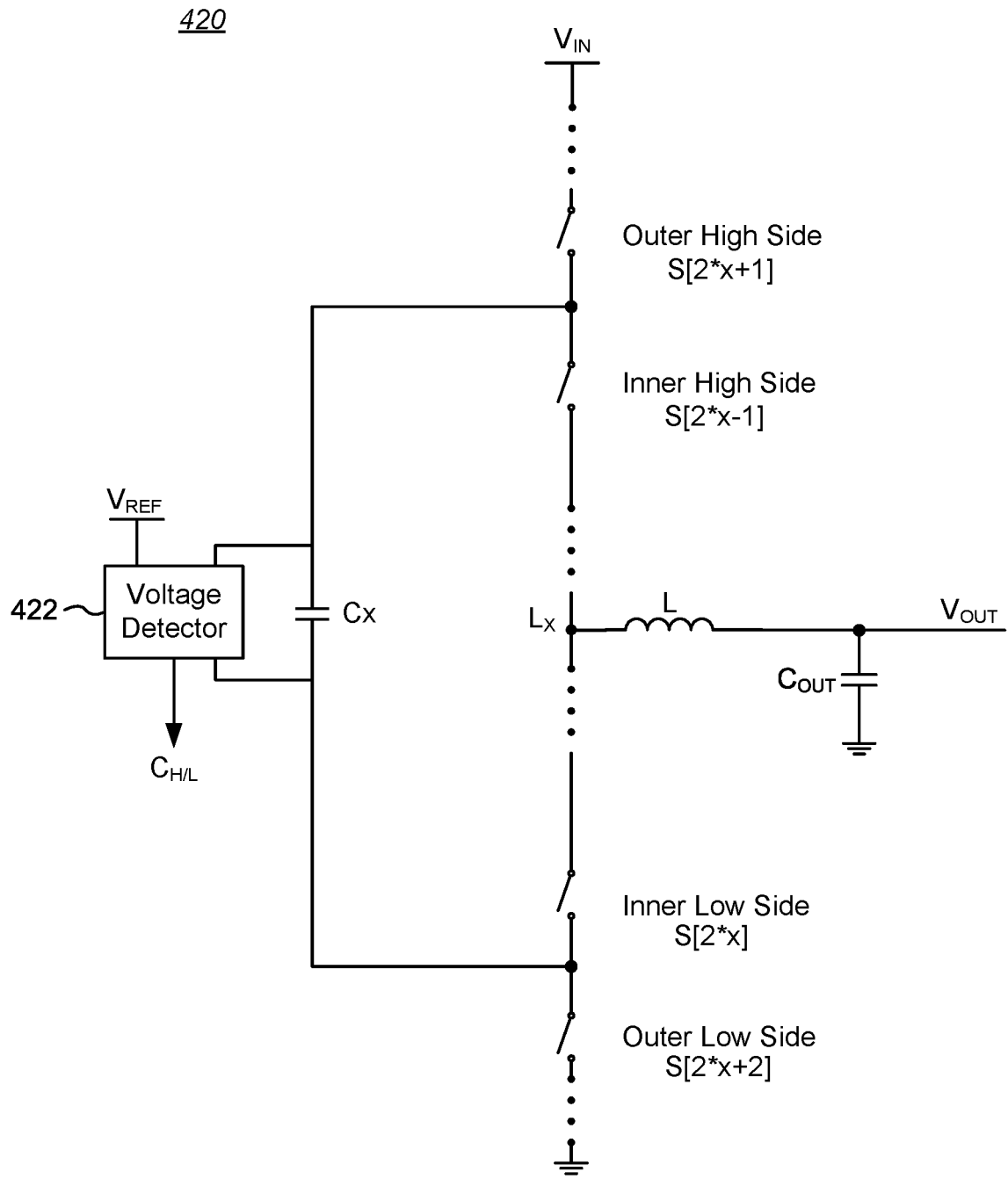
FIG. 4B is schematic diagram of one fly capacitor Cx from FIG. 4A showing corresponding "controlled" switch sets.

FIG. 4B is schematic diagram 420 of one fly capacitor Cx from FIG. 4A showing corresponding "controlled" switch sets. Each fly capacitor Cx has a first terminal coupled between an outer high-side switch S [2*x+1] and an inner high-side switch S [2*x−1], where "high-side" refers to the $V_{IN}$ side of the converter circuit. Each fly capacitor Cx has a second terminal coupled between an outer low-side switch S [2*x+2] and an inner low-side switch S [2*x], where "low-side" refers to the circuit ground (GND) side of the converter circuit. Thus, for an M=3 multi-level converter cell 400, a first terminal of the single (X=1) fly capacitor C1 would be coupled between outer high-side switch S3 and inner high-side switch S1, and a second terminal of the capacitor C1 would be coupled between inner low-side switch S2 and outer low-side switch S4. Accordingly, each fly capacitor Cx within the multi-level converter cell 400 has four switches that can affect current flow through that fly capacitor Cx.

Also shown in FIG. 4B is a voltage detector 422. The voltage detector 422, which may be a simple comparator-type circuit, senses the voltage across a corresponding fly capacitor Cx with respect to a reference voltage, $V_{REF}$, which represents a desired target voltage for the fly capacitor Cx. Every fly capacitor Cx has a target average voltage in order to maintain proper output level. For an M-level converter and capacitor Cx, where x=1, 2, . . . [M−2], its target voltage is:

$$Vtarget[Cx] = V_{IN} * \frac{x}{M-1}$$

The voltage detector 422 outputs a HIGH/LOW status signal, $C_{Fx}$_H/L, indicating with the voltage across the corresponding fly capacitor Cx is greater than $V_{REF}$ or less than $V_{REF}$. The $C_{Fx}$_H/L status signal is coupled to control circuitry for the switches associated with the fly capacitor Cx as described below.

The control circuitry for the four switches that can affect current flow through a fly capacitor Cx set states for those switches in part as a function of the voltage across the fly capacitor Cx as measured by the associated voltage detector 422 and conveyed by the $C_{Fx}$ H/LX status signal. Accordingly, for ease of understanding, it can be said that each fly capacitor Cx "controls" its own pairs of high-side and low-side switches.

If it is assumed that current flow in the inductor is charging the output $V_{OUT}$, there are four possible states that can be defined for the pairs of high-side and low-side switches for each fly capacitor Cx.

Figure 4C:
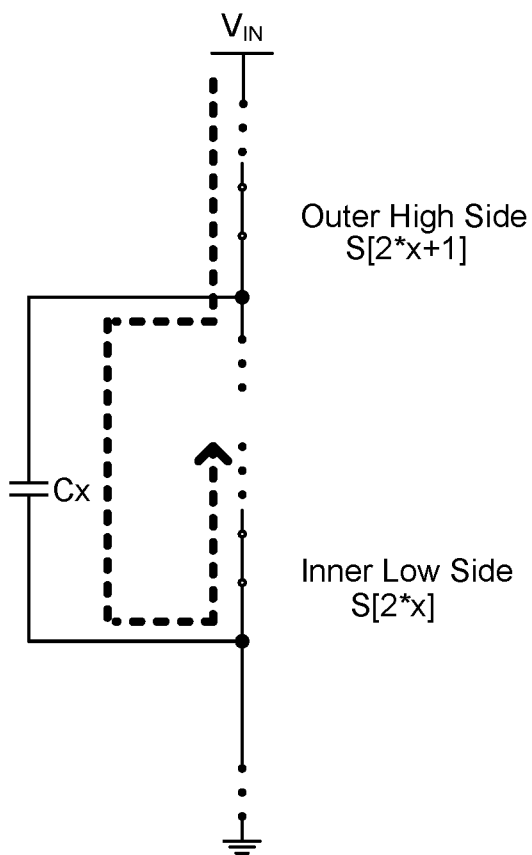
FIG. 4C is a version of FIG. 4B in which the outer high-side and inner low-side switches associated with fly capacitor Cx are closed and all other associated switches are open.

FIG. 4C is a version of FIG. 4B in which the outer high-side and inner low-side switches associated with fly capacitor Cx are closed and all other associated switches are open. In this switch state, fly capacitor Cx would be in a charging configuration (whether or not charging actually occurs may depend on the switch states for other fly capacitors Cx). The current flow path is indicated by the dashed arrow.

Figure 4D:
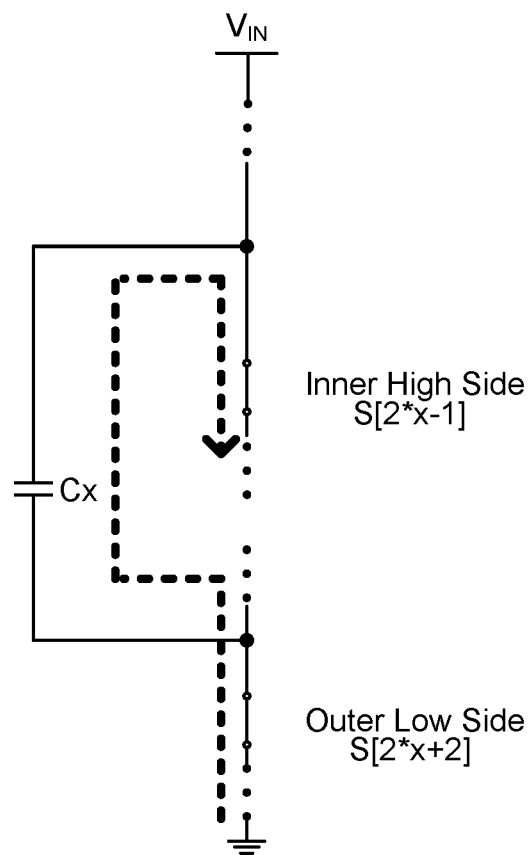
FIG. 4D is a version of FIG. 4B in which the inner high-side and outer low-side switches associated with fly capacitor Cx are closed and all other associated switches are open.

FIG. 4D is a version of FIG. 4B in which the inner high-side and outer low-side switches associated with fly capacitor Cx are closed and all other associated switches are open. In this switch state, fly capacitor Cx would be in a discharging configuration (whether or not discharging actually occurs may depend on the switch states for other fly capacitors Cx). The current flow path is indicated by the dashed arrow.

Figure 4E:
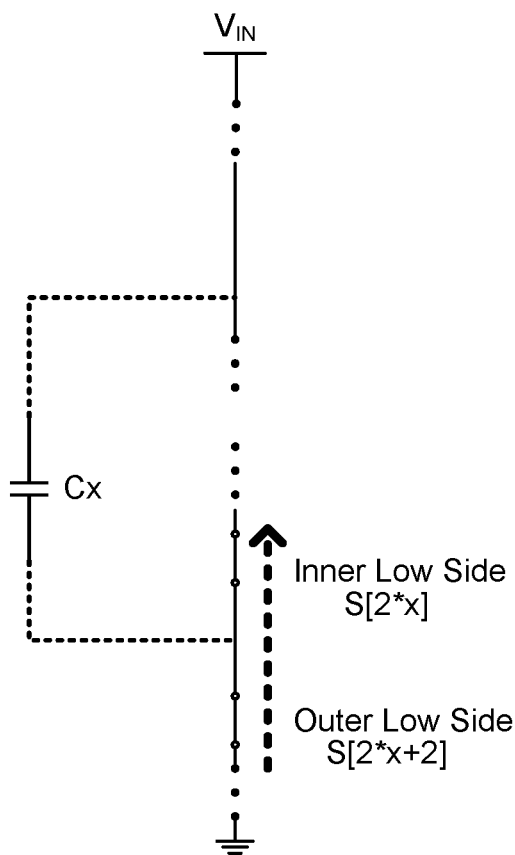
FIG. 4E is a version of FIG. 4B in which the inner low-side and outer low-side switches associated with fly capacitor Cx are closed and all other associated switches are open.

FIG. 4E is a version of FIG. 4B in which the inner low-side and outer low-side switches associated with fly capacitor Cx are closed and all other associated switches are open. In this switch state, fly capacitor Cx would be bypassed, as indicated by dotted connection lines. The current flow path is indicated by the dashed arrow.

Figure 4F:
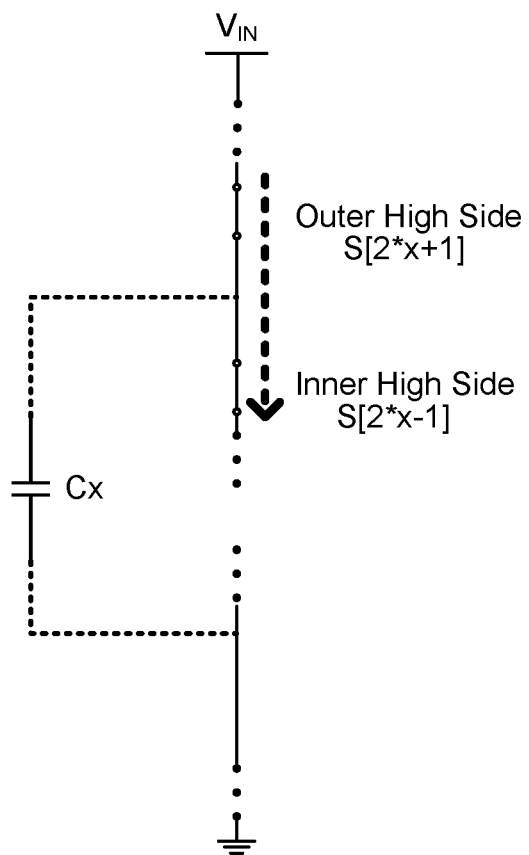
FIG. 4F is a version of FIG. 4B in which the outer high-side and inner high-side switches associated with fly capacitor Cx are closed and all other associated switches are open.

FIG. 4F is a version of FIG. 4B in which the outer high-side and inner high-side switches associated with fly capacitor Cx are closed and all other associated switches are open. In this switch state, fly capacitor Cx would again be bypassed, as indicated by dotted connection lines. The current flow path is indicated by the dashed arrow.

Note that in FIGS. 4C-4F, the current flow paths indicated by dashed arrows are for positive output currents; the current flow paths may reverse direction for negative output currents.

While each fly capacitor Cx can control both of its own pairs of high-side and low-side switches, in general, the preferred methods of control disclosed below utilize either the outer switches or the inner switches controllable by each corresponding capacitor. For example, referring to FIG. 4A, in "outer-switch" methods, fly capacitor C1 will control its outer switches S3 and S4, fly capacitor C2 will control its outer switches S5 and S6, etc. Conversely, for example, in "inner-switch" methods, fly capacitor C1 will control its inner switches S1 and S2, fly capacitor C2 will control its inner switches S3 and S4, etc. The switch states of either pair (inner or outer) of switches controlled by a fly capacitor Cx are always complementary—that is, no fly capacitor Cx closes or opens both of its high-side and low-side controlled switches at the same time. If each fly capacitor Cx controls its outer-switches, then no fly capacitor controls the left-over innermost switches S1 and S2. If instead each fly capacitor Cx controls its inner-switches, then no fly capacitor controls the left-over outermost switches S[2*(M−1)] and S[2*(M−2)+1]. Switch states for the left-over switches are also complementary.

Example Control Circuitry Embodiment

Figure 5:
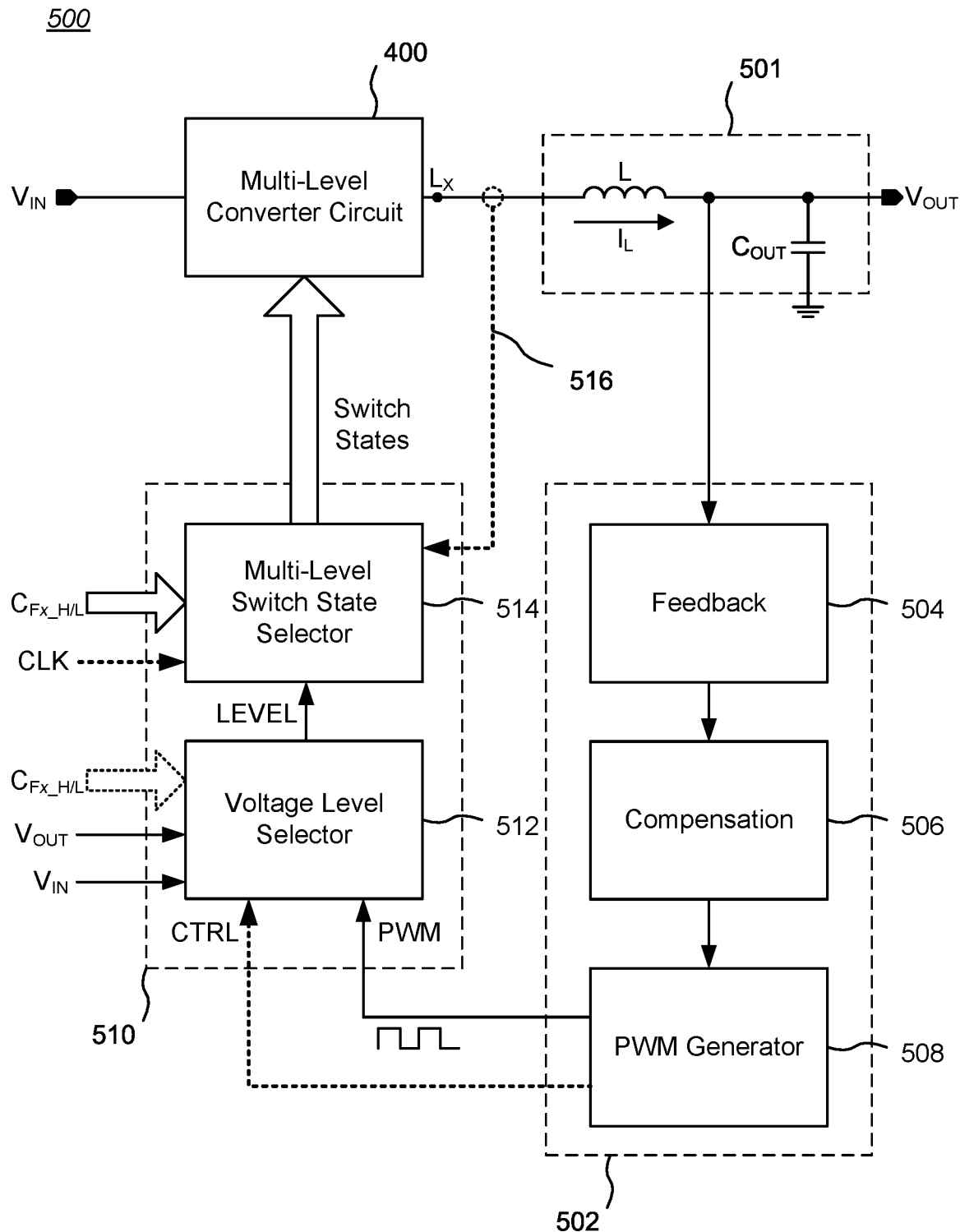
FIG. 5 is a block diagram of one embodiment of advanced control circuitry for an M-level converter cell such as the generalized version depicted in FIG. 4A.

FIG. 5 is a block diagram of one embodiment of advanced control circuitry 500 for an M-level converter cell 400 such as the generalized version depicted in FIG. 4A. The M-level converter cell 400 is shown coupled to an output block 501 comprising an inductor L and an output capacitor $C_{OUT}$ (conceptually, the inductor L also may be considered as being included within the M-level converter cell 400). The advanced control circuitry 500 functions as a control loop coupled to the output of the M-level converter cell 400 and to switch control inputs of the M-level converter cell 400. In general, the advanced control circuitry 500 is configured to monitor the output (e.g., voltage and/or current) of the M-level converter cell 400 and dynamically generate a set of switch control inputs to the M-level converter cell 400 that attempt to stabilize the output voltage and/or current at specified values, taking into account variations of $V_{IN}$ and output load. In alternative embodiments, the advanced control circuitry 500 may be configured to monitor the input of the M-level converter cell 400 (e.g., voltage and/or current) and/or an internal node of the M-level converter cell 400 (e.g., the voltage across one or more fly capacitors or the current through one or more power switches). Accordingly, most generally, the advanced control circuitry 500 may be configured to monitor the voltage and/or current of a node (e.g., input terminal, internal node, or output terminal) of the M-level converter cell 400. The advanced control circuitry 500 may be incorporated into, or separate from, the overall controller 104 for a power converter 100 embodying the M-level converter cell 400.

A first block comprises a feedback controller 502, which may be a traditional controller such as a fixed frequency voltage mode or current mode controller, a constant-ON-time controller, a hysteretic controller, or any other variant. The feedback controller 502 is shown as being coupled to $V_{ouT}$ from the M-level converter cell 400. In alternative embodiments, the feedback controller 502 may be configured to monitor the input of the M-level converter cell 400 and/or an internal node of the M-level converter cell 400. The feedback controller 502 produces a signal directly or indirectly indicative of the voltage at $V_{ouT}$ that determines in general terms what needs to be done in the multi-level converter cell 400 to maintain desired values for $V_{ouT}$: charge, discharge, or tri-state (i.e., open, with no current flow).

In the illustrated example, the feedback controller 502 includes a feedback circuit 504, a compensation circuit 506, and a PWM generator 508. The feedback circuit 504 may include, for example, a feedback-loop voltage detector which compares $V_{ouT}$ (or an attenuated version of $V_{ouT}$) to a reference voltage which represents a desired $V_{OUT}$ target voltage (which may be dynamic) and outputs a control signal to indicate whether $V_{ouT}$ is above or below the target voltage. The feedback-loop voltage detector may be implemented with a comparison device, such as an operational amplifier (op-amp) or transconductance amplifier (gm amplifier).

The compensation circuit 506 is configured to stabilize the closed-loop response of the feedback controller 502 by avoiding the unintentional creation of positive feedback, which may cause oscillation, and by controlling overshoot and ringing in the step response of the feedback controller 502. The compensation circuit 506 may be implemented in known manner, and may include LC and/or RC circuits.

The PWM generator 508 generates the actual PWM control signal which ultimately sets the duty cycle of the switches of the multi-level converter cell 400. In addition, in some embodiments, the PWM generator 508 may pass on additional optional control signals CTRL indicating, for example, the magnitude of the difference between $V_{ouT}$ and the reference voltage (thus indicating that some levels of the M-level converter cell 400 should be bypassed to get to higher or lower levels), and the direction of that difference (e.g., whether $V_{ouT}$ is greater than or less than the reference voltage). In other embodiments, the optional control signals CTRL can be derived from the output of the compensation circuit 506, or from the output of the feedback circuit 504, or from a separate comparator (not shown) coupled to, for example, $V_{OuT}$. One purpose of the optional control signals CTRL is for advanced control algorithms, when it may be beneficial to know how far away $V_{OuT}$ is from a target output voltage, thus allowing faster charging of the inductor L if the $V_{OuT}$ is severely under regulated.

A second block comprises a multi-level controller 510, the primary function of which is to select the switch states that generate a desired $V_{OuT}$ while maintaining a charge-balance state on the fly capacitors within the M-level converter cell 400 every time an output voltage level is selected, regardless of what switch state or states were used in the past.

The multi-level controller 510 includes a Voltage Level Selector 512 which receives the PWM control signal and the additional control signals CTRL if available. In addition, the Voltage Level Selector 512 may be coupled to $V_{OuT}$ and/or $V_{IN}$, and, in some embodiments, to the HIGH/LOW status signals, $C_{FX\_}H/L$, from the voltage detectors 422 coupled to corresponding fly capacitors Cx within the M-level converter cell 400. A function of the Voltage Level Selector 512 is to translate the received signals to an output voltage Target Level (e.g., on a cycle-by-cycle basis). The Voltage Level Selector 512 typically will consider at least $V_{OuT}$ and $V_{IN}$ to determine which Target Level should charge or discharge the output of the M-level converter cell 400 with a desired rate. For example, in a 6-level converter circuit, the available Target Levels are Level-1 (GND), Level-2 ($1/5V_{IN}$), Level-3 ($2/5V$ 1N), Level-4 ($3/5V_{IN}$), Level-5 ($4/5V_{IN}$), and Level-6 ($V_{IN}$), which may be represented as a count value from 1-6 (or 0-5).

As an example, in a 4-Level converter circuit, if $V_{IN}$=12V and $V_{OuT}$ nominally should be 3V, then the Voltage Level Selector 512 may indicate that a Target Level of "2" can be selected, which results in a $1/3V_{IN}$ voltage level at $L_x$ (i.e., 4V). The PWM control signal sets a duty cycle between that Target Level and another Target Level (e.g., GND) so that the average voltage level at $L_x$ will be about 3V.

In general, for steady-state operations, the Target Level voltage closest to $V_{OuT}$ that either charges or discharges the inductor L may be selected for simplicity of the selection algorithm. In general, for transient response, a Target Level that is higher (for charging) or lower (for discharging) than the closest Target Level may be selected to quickly charge or discharge the inductor L. The Voltage Level Selector 512 may be implemented, for example, as a look-up table (LUT) or as comparison circuitry and combinatorial logic or more generalized processor circuitry. In some embodiments, the Voltage Level Selector 512 can implement advanced methods (described below) that try to speed up charging or discharging based on additional factors, such as inductor voltage drop, load transients, the magnitude of output deviations, and/or external input signals from external sources. The output of the Voltage Level Selector 512 may include duty cycle information (e.g., derived from the input PWM control signal) as well as switch state.

The output of the Voltage Level Selector 512 is coupled to a Multi-Level Switch State Selector 514, which generally would be coupled to the status signals, $C_{FX\_}H/L$, from the voltage detectors 422 for the fly capacitors Cx. Taking into account the Target Level generated by the Voltage Level Selector 512, the Multi-Level Switch State Selector 514 determines a pattern of switch states for the desired output level that generally achieves charge-balancing the fly capacitors Cx. The Multi-Level Switch State Selector 514 may be implemented, for example, as comparison circuitry and combinatorial logic, as a look-up table (LUT), or as more generalized processor circuitry. The output of the Multi-Level Switch State Selector 514 is coupled to the switches of the multi-level converter cell 400 (through appropriate level-shifter circuits and drivers circuits, as may be needed for a particular converter cell) and includes a pattern of switch state settings determined by the Multi-Level Switch State Selector 514. The pattern of switch state settings selects the configuration of the switches within the multi-level converter cell 400.

In general (but not always), for PWM-based control systems, the Voltage Level Selector 512 and the M-level Switch State Selector 514 only change their states when the PWM signal changes. For example, when the PWM signal goes high, the Voltage Level Selector 512 selects which level results in charging of the inductor L and the M-level Switch State Selector 514 sets which version to use of that level. Then when the PWM signal goes low, the Voltage Level Selector 512 selects which level can discharge the inductor L and the M-level Switch State Selector 514 sets which version of that level to use. Thus, the Voltage Level Selector 512 and the M-level Switch State Selector 514 generally only change states when the PWM signal changes (the PWM signal is in effect their clock signal). However, there may be situations or events where it is desirable for the CTRL signal to change the state of the Voltage Level Selector 512. Further, there may be situations or events where it is desirable for the $C_{Fx\_}H/L$ status signal(s) to cause the M-level Switch State Selector 514 to select a particular configuration of power switch settings, such as when a severe mid-cycle imbalance occurs. In some embodiments, it may be useful to include a timing function that forces the M-level Switch State Selector 514 to re-evaluate the optimal version of the state periodically, for example, in order to avoid being "stuck" at one level for a very long time, potentially causing charge imbalances.

One notable benefit of the control circuitry shown in FIG. 5 is that it enables generation of voltages in boundary zones between voltage levels, which represent unattainable output voltages for conventional multi-level DC-to-DC converter circuits.

In alternative unregulated charge-pumps embodiments, the feedback controller 502 and the Voltage Level Selector 512 may be omitted, and instead a clock signal CLK may be applied to the M-level Switch State Selector 514. The M-level Switch State Selector 514 would generate a pattern of switch state settings that periodically charge balances the fly capacitors Cx regardless of what switch state or states were used in the past (as opposed to cycling through a predefined sequency of states). This ensures that if $V_{IN}$ changes or anomalous evens occur, the system generally always seeks charge balance for the fly capacitors Cx.

In some embodiments, the M-level Switch State Selector 514 may take into account the current $I_L$ flowing through the inductor L by way of an optional current-measurement input 516, which may be implemented in conventional fashion.

Set forth below are control methods that may be implemented within the Multi-Level Switch State Selector 514 to select an essentially optimal switch state per cycle that moves the fly capacitors Cx towards a charge-balance state regardless of past switch states.

General Control Method

In an M-level multi-level converter circuit, the configuration of switches that achieves Level-1 (e.g., GND) or Level-M (e.g., $V_{IN}$) effectively bypasses the fly capacitors Cx. Conversely, for all intermediate voltage levels, at least one fly capacitor Cx is coupled to $V_{OUT}$ and there are always at least two configurations of switches that can achieve any intermediate voltage level. For any particular intermediate voltage level, at least one configuration of switches results in charging the associated fly capacitor and at least one other configuration of switches results in discharging the associated fly capacitor. One aspect of the present invention is the realization that any achievable output voltage $V_{OUT}$ requiring intermediate voltage levels can be attained by dynamically selecting patterns of switch configurations—that is, by selecting switch configurations without regard to or memory of the switch configurations of any previous switching cycle—to select appropriate Levels, and doing so in a way that purposefully selects either charging or discharging switch configurations that also balance charge across the fly capacitors Cx.

Embodiments of the invention use the following approach for positive inductor L current (charging $V_{OUT}$):
  (1) a fly capacitor Cx that needs charging will be set to close its charging switch (the outer high-side switch in outer-switch control methods, or the inner low-side switch for inner-switch control methods); and
  (2) a fly capacitor Cx that needs discharging will be set to close its discharging switch (the outer low-side switch for outer-switch control methods, or the inner high-side switch for inner-switch control methods).

For negative inductor L current (discharging $V_{OUT}$), the selection of switches inverts. Accordingly:
  (1) a fly capacitor Cx that needs charging will be set to close its charging switch (the outer low-side switch in outer-switch control methods, or the inner high-side switch for inner-switch control methods); and
  (2) a fly capacitor Cx that needs discharging will be set to close its discharging switch (the outer high-side switch for outer-switch control methods, or the inner low-side switch for inner-switch control methods).

Note again that whether or not charging actually occurs for a particular fly capacitor Cx generally depends on the switch states for all other fly capacitors. For a fly capacitor C(x) to actually charge or discharge, the next inward (if one exists) fly capacitor C(x−1) (for outer-switch control methods) or the previous outward (if one exists) fly capacitor C(x+1) (for inner-switch control methods) must be set to the opposite state (i.e., discharge or charge) so that a bypass situation does not occur.

For any multi-level converter circuit of order M that can create M voltage levels—i.e., Level-1 (e.g., GND) through Level-M (e.g., $V_{IN}$)— then the following switch count rules apply for any Level-m:
  (1) M−m low-side switches must be set to be closed (ON);
  (2) m−1 high-side switches must be set to be closed (ON); and
  (3) switches that are not required to be ON must be set to be OFF (open).

With these switch count rules in mind, the following generalized capacitor control method applies for each state change of the Multi-Level Switch State Selector 514:
  Step 1) Select a fly capacitor that has not previously been selected; Step 2) If the voltage of the selected fly capacitor is above its Vtarget and there are remaining (i.e., not been set by this method in this cycle) low-side or high-side switches that can be set to be closed to enable a discharge path for the selected fly capacitor, then set those switches that enable a discharge path for the selected fly capacitor to be closed, decrement one or more appropriate counters (e.g., for the number of low-side switches set to be closed and the number of high-side switches set to be closed), and flag the current fly capacitor as "done" (i.e., as having been selected); otherwise (since the voltage of the selected fly capacitor is below its Vtarget) set the switches that enable a charging path for the selected fly capacitor to be closed and flag the current fly capacitor as "done";
  Step 3) Loop to Step 1 until all fly capacitors have been selected;
  Step 4) For the remaining pair of left-over switches, set the high-side switch or the low-side switch to be closed based on the switch count rules and the counter values.

With the above generalized capacitor control method, more specific multi-level charge-balancing control methods can be created; examples are given below.

A. Outward-In Methods

Outward-In methods apply the generalized capacitor control method starting with the outward-most fly capacitor (C[M−2] in FIG. 4A) of an M-level converter circuit and sequentially working toward the inward-most fly capacitor (C1 in FIG. 4A). Thus, Outward-In methods give priority to the outward fly capacitors—that is, the outward fly capacitors are given the first opportunity to set their controlled switches to a charging or discharging state. For any fly capacitor not to be bypassed, the following (more inward) fly capacitor (if one exists) needs to set its controlled switches to the opposite state (i.e., discharging or charging). This results in the more inward fly capacitors taking precedence when the same charging/discharging state is being selected in a row.

There are two variants of the Outward-In method: an outer-switch method in which each fly capacitor Cx controls the state of its outer set of switches, and an inner-switch method in which each fly capacitor Cx controls the state of its inner set of switches.

(1) Outward-In Outer-Switch Method

Keeping in mind the switch count rules, and that setting one switch of a pair of switches to be closed means that the other switch of the pair is set to be open, the following general Outward-In outer-switch method applies for each switching cycle of an M-level converter circuit:

Step 1) Select the outward-most fly capacitor that has not been considered yet (thus, start with fly capacitor C[M−2]);

Step 2) If the voltage of the selected fly capacitor is above its Vtarget AND the number of low-side switches for all more-inward fly capacitors has not been exhausted THEN set the outer low-side switch of the selected fly capacitor to be closed to discharge the selected fly capacitor; ELSE, since the voltage of the selected fly capacitor is below its Vtarget, set the outer high-side switch of the selected fly capacitor to be closed to charge the selected fly capacitor;

Step 3) Loop to Step 1 until all fly capacitors have been selected;

Step 4) For the remaining pair of left-over inward-most inner switches (S1 and S2), set the high-side switch or the low-side switch to be closed based on the switch count rules.

There are different ways of keeping track of how many high-side or low-side switches have been set to be closed or opened and knowing when the limit of total switches has been reached. One way to do this is to recognize that each multi-level converter circuit as a whole represents a structure of a particular complexity, and that each more-inward fly capacitor represents a lower-complexity multi-level converter circuit substructure that has one less available voltage level than the next more-outward converter circuit.

For example, one accounting method that may be implemented in the Multi-Level Switch State Selector 514 includes the following steps:

A) The fly capacitors Cx are provided with a Target Level.
B) In response to its own measured voltage, if a fly capacitor Cx sets itself to discharge by setting its low-side switch to be closed, then the same Target Level is passed on for (assigned to) the next inner fly capacitor.
C) If instead a fly capacitor Cx sets itself to charge by setting its high-side switch to be closed, then the received Target Level is decremented by one and passed on for (assigned to) the next inner fly capacitor.
D) If the Target Level for a fly capacitor Cx is "1", then the fly capacitor Cx must set its outer low-side switch to be closed.
E) Conversely, if the Target Level for a fly capacitor Cx represents the maximum voltage level for the lower-complexity substructure of the converter circuit corresponding to that fly capacitor Cx, then the fly capacitor Cx must set its outer high-side switch to be closed.
F) The process loops to step B) until all switches connecting associated fly capacitors Cx have been set to an open or closed state.
G) For the remaining pair of left-over inward-most inner switches (S1 and S2), set the high-side switch or the low-side switch to be closed based on the switch count rules.

Figure 6A:
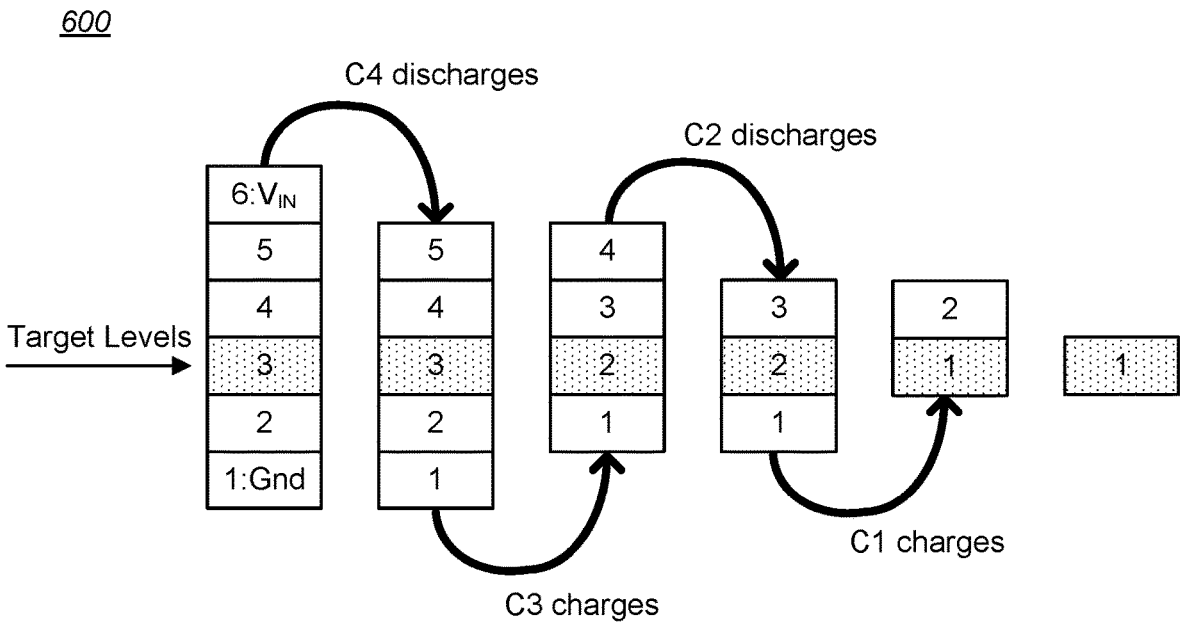
FIG. 6A is a diagram of a first example of Target Level transitions and fly capacitor charge or discharge events for an example 6-level converter.

To illustrate this accounting process, FIG. 6A is a diagram 600 of a first example of Target Level transitions and fly capacitor charge or discharge events for an example 6-level converter structure. The figure shows how many Levels are available at each step of the method and the shaded row indicates the Target Level a current step is required to regulate to. For example, in a 6-level converter circuit, the available Target Levels are Level-1 (GND), Level-2 ($1/5V_{IN}$), Level-3 ($2/5V_{IN}$), Level-4 ($3/5V_{IN}$), Level-5 ($4/5V_{IN}$), and Level-6 ($V_{IN}$), which may be represented as a count value from 1-6 (or 0-5).

The first column shows that all 6 Levels (GND to $V_{IN}$) are available for the outward-most fly capacitor (i.e., C4 in this example). The provided Target Level in this example is "3" (i.e., $2/5V_{IN}$), which is not a limiting minimum or maximum voltage level. Thus, fly capacitor C4 is free to select a charge or discharge mode based on its own measured voltage. In the illustrated example, fly capacitor C4 selects a discharge mode for its controlled switches (S10 & S9), which effectively lowers $V_{IN}$ to the next fly capacitor by one Level (that is, the next fly capacitor, C3, is effectively connected between GND and $4/5V_{IN}$).

The second column shows that fly capacitor C3 is the outward-most capacitor of a lower-complexity 5-Level converter substructure. Since fly capacitor C4 was set to a discharge mode, the Target Level is still "3" and fly capacitor C3 is free to select a charge or discharge mode based on its own measured voltage. In the illustrated example, fly capacitor C3 selects a charge mode for its controlled switches (S8 & S7), which effectively removes a voltage level from the remaining lower-complexity substructures of the converter circuit by increasing the ground node by one Level (that is, the next fly capacitor, C2, is effectively connected between $1/5V_{IN}$ and $4/5V_{IN}$).

The third column shows that fly capacitor C2 is the outward-most capacitor of a lower-complexity 4-Level converter substructure. Since fly capacitor C3 charged, the Target Level is decremented to "2". The fly capacitor is still free to select a charge or discharge mode based on its own measured voltage. In the illustrated example, fly capacitor C2 selects a discharge mode for its controlled switches (S6 & S5), which effectively lowers $V_{IN}$ to the next fly capacitor by one Level (that is, the next fly capacitor, C1, is effectively connected between $1/5V_{IN}$ and $3/5V_{IN}$).

The fourth column shows that fly capacitor C1 is the outward-most capacitor of a lower-complexity 3-Level converter substructure. This is the last available capacitor, and since the Target Level count of "2" is in the middle, the fly capacitor is free to select a charge or discharge mode based on its own measured voltage. In the illustrated example, fly capacitor C1 selects a charge mode for its controlled switches (S4 & S3). Doing so removes a ground level, which effectively removes a level from the remaining lower-complexity substructures of the converter circuit by increasing the ground node by one Level (that is, between $2/5V_{IN}$ and $4/5V_{IN}$).

The fifth column pertains to the left-over pair of switches of the inward-most lowest-complexity substructure (S2 & S1). Since fly capacitor C1 charged, the Target Level is decremented to "1". The Multi-Level Switch State Selector 514 for the converter circuit will set either the high-side switch or the low-side switch to be closed depending on how many high-side switches and low-side switches have been set to be closed previously. The method stays the same: at this point, the Target Level will be either "1" (i.e., the minimum substructure Level of $2/5V_{IN}$) or "2" (the maximum substructure Level of $3/5V_{IN}$) and thus dictate which switch to set to a closed state. In the illustrated example, since the Target Level count is now "1", the low-side switch is set to be closed, and the desired output voltage $V_{OUT}=2/5V_{IN}$ is reached in the sixth column.

Each step in the above process thus reduces the Target Level by one, either by removing a level from the top or by removing a level from the bottom. In essence, each step selects to charge or discharge a corresponding fly capacitor until the Target Level is reached, at which point remaining steps stop affecting the output.

Figure 6B:
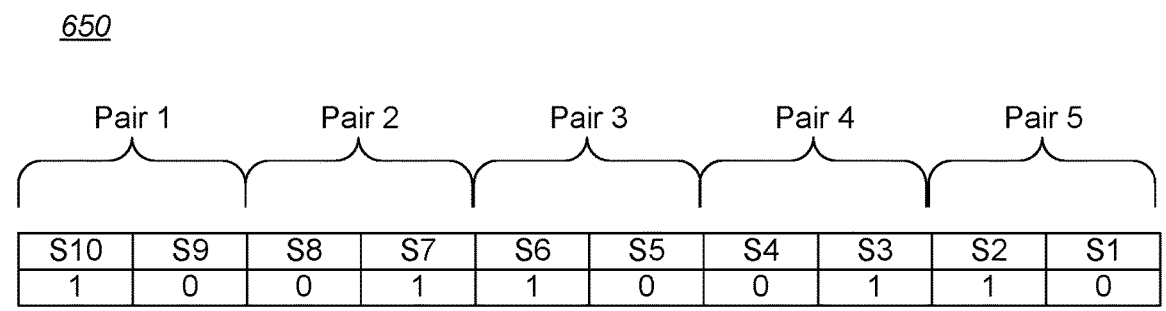
FIG. 6B is a table showing the pattern of switch states generated by the process shown in FIG. 6A.

FIG. 6B is a table 650 showing the pattern of switch states generated by the process shown in FIG. 6A. In each switch pair, a "1" in the second row of the table indicates set to be closed, and a "0" indicates set to be open. For example, for Pair 1, outer low-side switch S10 is set to be closed, and outer high-side switch S9 is set to be open. As another example, for pair 4, outer low-side switch S4 is set to be open, and outer high-side switch S39 is set to be closed. Note that the illustrated example is for positive inductor current $I_L$; for negative inductor current $I_L$, the open and closed states shown in table 650 would be reversed.

Figure 7A:
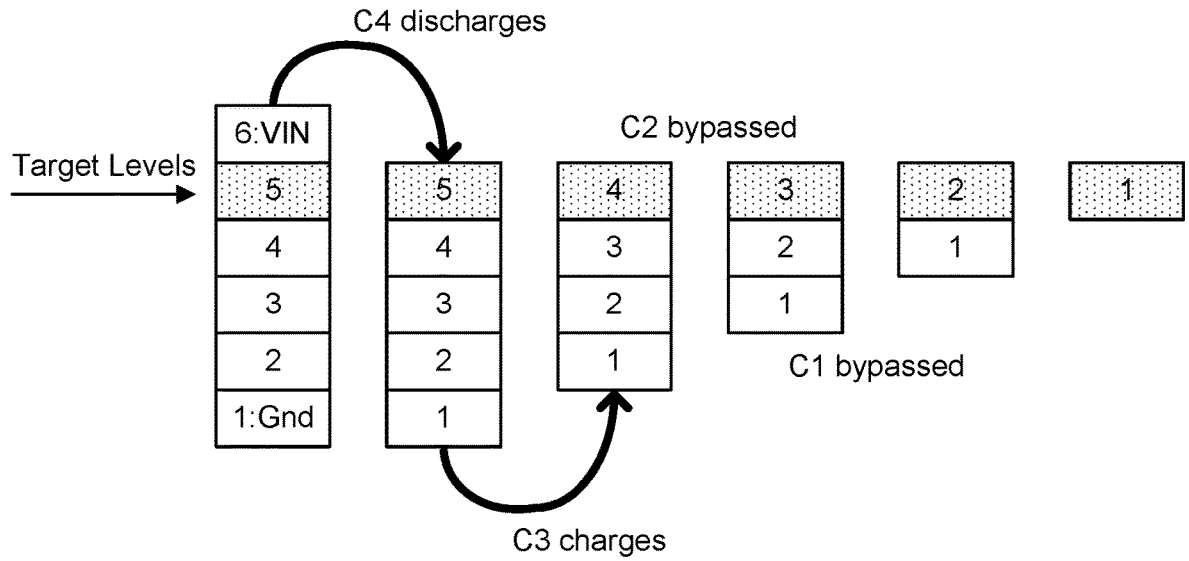
FIG. 7A is a diagram of a second example of Target Level transitions and fly capacitor charge or discharge events for an example 6-level converter.

FIG. 7A is a diagram 700 of a second example of Target Level transitions and fly capacitor charge or discharge events for an example 6-level converter. In the illustrated example, the steps reach the top level early on in the process.

The first column shows that all 6 Levels (GND to $V_{IN}$) are available for the outward-most fly capacitor (i.e., C4 in this example). The provided voltage Target Level in this example is "5" (i.e., $4/5V_{IN}$), which is not a limiting minimum or maximum Level. Thus, fly capacitor C4 is free to select a charge or discharge mode based on its own measured voltage. In the illustrated example, fly capacitor C4 selects a discharge mode for its controlled switches, which effectively lowers $V_{IN}$ to the next fly capacitor by one Level (that is, the next fly capacitor, C3, is effectively connected between GND and $4/5V_{IN}$).

The second column shows that fly capacitor C3 is the outward-most capacitor of a lower-complexity 5-Level converter substructure. Since fly capacitor C4 was set to a discharge mode, the Target Level is still "5". Fly capacitor C3 is constrained by this maximum level. Accordingly, fly capacitor C3 must select a charge mode, which effectively removes a level from the remaining elements of the converter circuit by increasing the ground node by one Level (that is, the next fly capacitor, C2, is effectively connected between $1/5V_{IN}$ and $4/5V_{IN}$). Since fly capacitor C3 charged, the Target Level is decremented from "5" to "4".

The third column shows that fly capacitor C2 is the outward-most capacitor of a lower-complexity 4-Level converter substructure. At this point, the Target Level is its maximum level for this substructure, and fly capacitor C2 is forced to select a charge mode; accordingly, the Target Level counter is decremented from "4" to "3" (that is, the next fly capacitor, C1, is effectively connected between $2/5V_{IN}$ and $4/5V_{IN}$). Note that while a charge mode is selected by fly capacitor C2 in terms of its controlled switch settings, it may be bypassed in terms of actual current flow due to the switch settings of other fly capacitors.

The fourth column shows that fly capacitor C1 is the outward-most capacitor of a lower-complexity 3-Level converter substructure. This is the last available capacitor, and since the Target Level count is at the maximum level at this step, fly capacitor C1 is forced to select a charge mode and accordingly the Target Level is decremented from "3" to "2" (that is, the last substructure is effectively connected between $3/5V_{IN}$ and $4/5V_{IN}$). Again, while charge mode is selected by fly capacitor C1 in terms of its controlled switch settings, it may be bypassed in terms of actual current flow due to the switch settings of other fly capacitors.

The fifth column pertains to the left-over pair of switches as the lowest-complexity inward-most substructure. The Multi-Level Switch State Selector 514 for the converter circuit will set either the high-side switch or the low-side switch to be closed depending on how many high-side switches and low-side switches have been set to be closed previously. The method stays the same: at this point, the Target Level will be either "1" (i.e., the minimum substructure Level of $3/5V_{IN}$) or "2" (the maximum substructure Level of $4/5V_{IN}$) and thus dictate which switch to set to a closed state. In the illustrated example, since the Target Level count is now "2", the high-side switch is set to be closed, and the desired output voltage $V_{OUT}=4/5V_{IN}$ is reached in the sixth column.

In the example of FIG. 7A, as soon as the maximum state is reached, all subsequent substructures are forced to turn on their respective high-side switch and bypass power flow to the output.

Figure 7B:
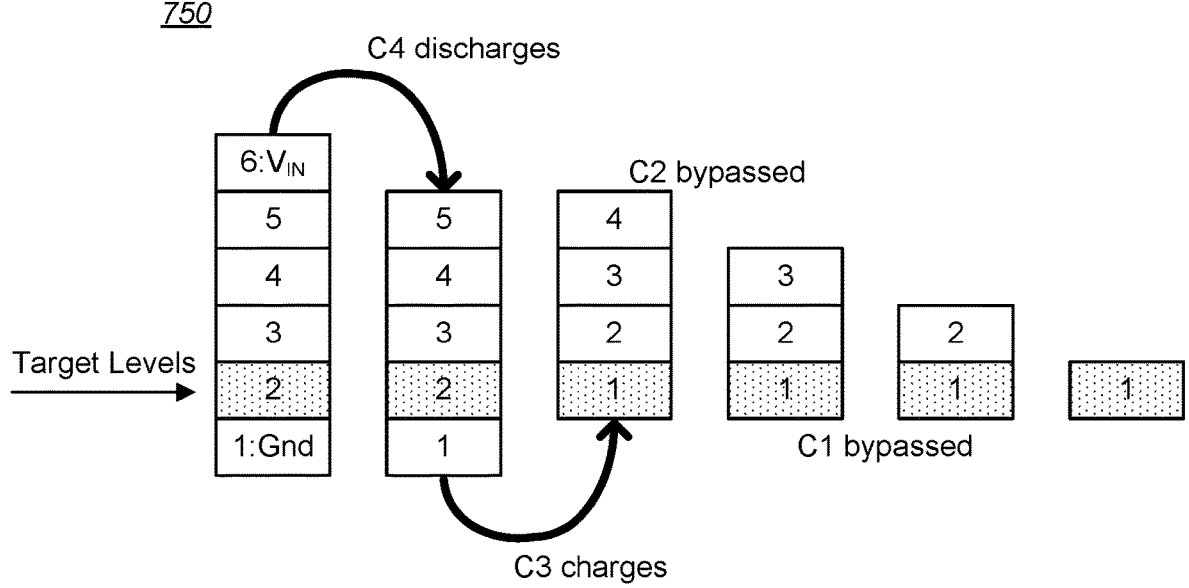
FIG. 7B is a diagram of a third example of Target Level transitions and fly capacitor charge or discharge events for an example 6-level converter.

FIG. 7B is a diagram 750 of a third example of Target Level transitions and fly capacitor charge or discharge events for an example 6-level converter structure. In the illustrated example, the stages reach the bottom level early on in the process.

The first column again shows that all 6 Levels (GND to $V_{IN}$) are available for the outward-most fly capacitor (i.e., C4 in this example). The provided Target Level in this example is "2" (i.e., $1/5V_{IN}$), which is not a limiting minimum or maximum Level. Thus, fly capacitor C4 is free to select a charge or discharge mode based on its own measured voltage. In the illustrated example, fly capacitor C4 selects a discharge mode for its controlled switches, which effectively lowers $V_{IN}$ to the next fly capacitor by one Level (that is, the next fly capacitor, C3, is effectively connected between GND and $4/5V_{IN}$).

The second column again shows that fly capacitor C3 is the outward-most capacitor of a lower-complexity 5-Level converter substructure. Since fly capacitor C4 was set to a discharge mode, the Target Level is still "2". Accordingly, fly capacitor C3 is free to select a charge or discharge mode based on its own measured voltage. In the illustrated example, fly capacitor C3 selects a charge mode for its controlled switches, which effectively removes a level from the remaining elements of the converter circuit by increasing the ground node by one Level (that is, the next fly capacitor, C2, is effectively connected between $1/5V_{IN}$ and $4/5V_{IN}$). Since fly capacitor C3 charged, the Target Level is decremented from "2" to "1".

The third column shows that fly capacitor C2 is the outward-most capacitor of a lower-complexity 4-Level converter substructure. At this point, the Target Level is its minimum level for this substructure (i.e., fly capacitor C2 has received a Target Level of "1"), and fly capacitor C2 is forced to select a discharge mode which effectively lowers $V_{IN}$ to the next fly capacitor by one Level (that is, the next fly capacitor, C1, is effectively connected between $1/5V_{IN}$ and $3/5V_{IN}$). Note that while discharge mode is selected by fly capacitor C2 in terms of its controlled switch settings, it will be bypassed in terms of actual current flow due to the switch settings of other fly capacitors.

The fourth column shows that fly capacitor C1 is the outward-most capacitor of a lower-complexity 3-Level converter substructure. This is the last available capacitor, and since the Target Level count is at the minimum level, fly capacitor C1 is forced to select a discharge mode which effectively lowers $V_{IN}$ to the next substructure by one Level (that is, the next substructure is effectively connected between $1/5V_{IN}$ and $2/5V_{IN}$). Again, while discharge mode is selected by fly capacitor C1 in terms of its controlled switch settings, it will be bypassed in terms of actual current flow due to the switch settings of other fly capacitors.

The fifth column pertains to the left-over pair of switches as the lowest-complexity inward-most substructure. The Multi-Level Switch State Selector 514 for the converter circuit will set either the high-side switch or the low-side switch to be closed depending on how many high-side switches and low-side switches have been set to be closed previously. The method stays the same: at this point, the Target Level will be either 1" (i.e., the minimum substructure Level of $1/5V_{IN}$) or "2" (the maximum substructure Level of $2/5V_{IN}$) and thus dictate which switch to set to a closed state. In the illustrated example, since the Target Level count is now "1", the low-side switch is set to be closed, and the desired output voltage $V_{OUT}=1/5V_{IN}$ is reached in the sixth column.

In the example of FIG. 7B, as soon as the minimum state is reached, all subsequent substructures are forced to turn on their respective low-side switch and bypass power flow to the output.

As shown with the examples above, a charge or discharge mode is selected for each substructure until the top or bottom level is picked. After that, all remaining inner substructures also forced to select their top or bottom level as well.

Figure 8:
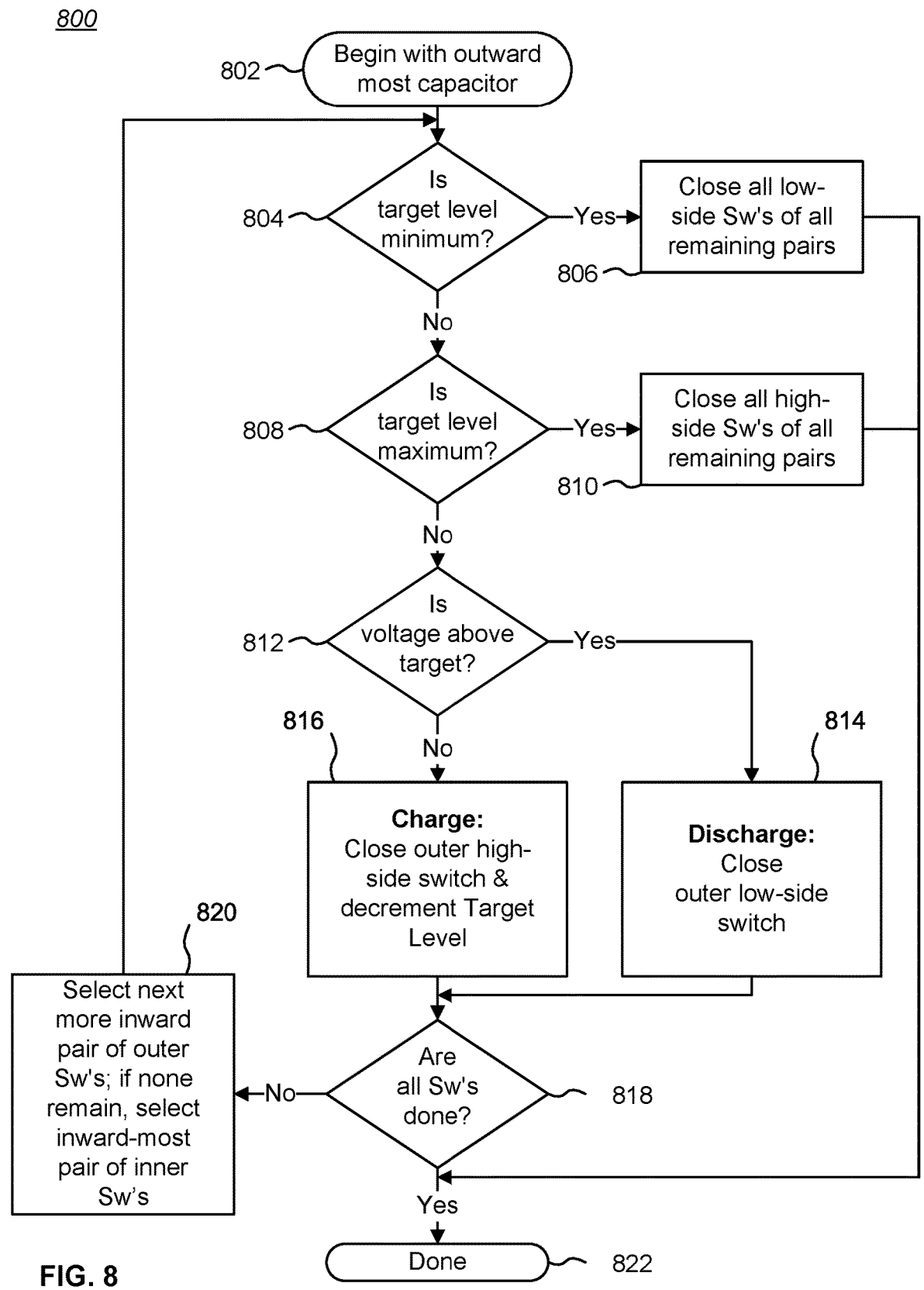
FIG. 8 is a more detailed flowchart of the Outward-In outer-switch method.

FIG. 8 is a more detailed flowchart 800 of the Outward-In outer-switch method. Beginning with the outward-most fly capacitor [Step 802], the Multi-Level Switch State Selector 514 determines if the Target Level is at the minimum [Step 804]; if so, the outer low-side switches of all remaining switch pairs in the converter circuit are set to be closed [Step 806] and the process is done [Step 822]. For the sake of brevity in the figure, "set to be closed" is shortened to "close", which is ultimately what occurs as or after the set of switch states is fully determined.

If the Target Level is not at the minimum [Step 804], the Multi-Level Switch State Selector 514 determines if the Target Level is at the maximum [Step 808]; if so, the outer high-side switches of all remaining switch pairs in the converter circuit are set to be closed [Step 810] and the process is done [Step 822]. Note that decision steps 804 and 808 may be performed in either order.

If the Target Level is not at the maximum [Step 808], the Multi-Level Switch State Selector 514 determines if the voltage across the current fly capacitor is above Vtarget for that fly capacitor [Step 812]; if so, then the outer low-side switch controlled by the fly capacitor is set to be closed, which places that fly capacitor into a discharge mode [Step 814]. Thereafter, processing continues at Step 818.

If the voltage across the fly capacitor is not above Vtarget for that fly capacitor [Step 812], then the outer high-side switch controlled by the fly capacitor is set to be closed, which places that fly capacitor into a charge mode; in addition, the Target Level is decremented [Step 816]. Thereafter, processing continues at Step 818.

A determination is made as to whether all switch pairs have had appropriate states set [Step 818]; if so, the process is done [Step 822], and if not, the next more-inward pair of outer switches are selected; if none remain, then select the pair of inward-most inner switches (S1, S2) [Step 820] and the process loops to Step 804. Since the switch states of either pair of switches (inner or outer) controlled by a fly capacitor Cx are always complementary, selecting a closed state for one switch of a pair necessarily means that the other switch of the pair has an open state.

The Outward-In outer-switch method allows arbitrary transitions from any Level to other Level while preserving the charge-balance of the fly capacitor Cx. In addition, this method is able to deal with line and load transients while automatically rebalancing capacitors as may be needed. Another advantage of this method is ease of implementation: the method is as simple as sensing the voltage across each fly capacitor and comparing that voltage to the target voltage for that fly capacitor in order to decide the state of the switches associated with that fly capacitor.

Variations of the Outward-In outer-switch method may be useful in some applications. For example, since outward-most capacitors have first pick as to their charging/discharging state, it may be beneficial to introduce a more complex decision tree:

(1) If an inward fly capacitor requires charge balancing while the fly capacitor of the current converter structure or substructure does not, the current fly capacitor can restrict its switch state choices to those switch states that allow the inward fly capacitor to charge balance; or (2) If two process steps in succession select the same switch state, then the outward fly capacitor is effectively bypassed. Accordingly, a condition can be added: if the current fly capacitor requires urgent charge balancing, then force the next more-inward fly capacitor to select the opposite switch state (charge or discharge) relative to the current fly capacitor, if permitted, so that the more-outward substructure will not be bypassed.

(2) Outward-In Inner-Switch Method

Again keeping in mind the switch count rules, and that setting one switch of a pair of switches to be closed means that the other switch of the pair is set to be open, the following general Outward-In inner-switch method applies for each switching cycle of an M-level converter circuit:

Step 1) Select the outward-most fly capacitor that has not been considered yet (thus, start with fly capacitor C[M−2]);

Step 2) If the voltage of the selected fly capacitor is above its Vtarget AND the number of high-side switches for all more-inward fly capacitors has not been exhausted THEN set the inner high-side switch of the selected fly capacitor to be closed to discharge the selected fly capacitor; ELSE, since the voltage of the selected fly capacitor is below its Vtarget, set the inner low-side switch of the selected fly capacitor to be closed to charge the selected fly capacitor;

Step 3) Loop to Step 1 until all fly capacitors have been selected;

Step 4) For the remaining pair of left-over outward-most outer switches (S [2*x+1] and S [2*x+2]), set the high-side switch or the low-side switch to be closed based on the switch count rules.

The Outward-In inner-switch method above is almost identical to the Outward-In outer-switch method. The key differences are:

(1) the opposite switch is selected (high-side versus low-side) when deciding to charge or discharge a fly capacitor; and (2) the left-over switches are not the inward-most switches but instead are the outward-most pair of outer switches.

The simplified accounting method described above for the Outward-In outer-switch method regarding keeping track of how many high-side or low-side switches have been set to be closed or opened and knowing when the limit of total switches has been reached needs minor modification for the Outward-In inner-switch method. One modified accounting method that may be implemented in the Multi-Level Switch State Selector 514 includes the following steps:

A) The fly capacitors Cx are provided with a Target Level.

B) In response to its own measured voltage, if a fly capacitor Cx sets itself to charge by setting its low-side switch to be closed, then the same Target Level is passed on for the next inner fly capacitor.

C) If instead a fly capacitor Cx sets itself to discharge by setting its high-side switch to be closed, then the received Target Level is decremented by one and passed on for the next inner fly capacitor.

D) If the Target Level for a fly capacitor Cx is "1", then the fly capacitor Cx must set its low-side switch to be closed.

E) Conversely, if the Target Level for a fly capacitor Cx is the maximum voltage level for that substructure of the converter circuit, then the fly capacitor Cx must set its high-side switch to be closed.

G) For the remaining pair of left-over outward-most outer switches (S[2*x+1] and S [2*x+2]), set the high-side switch or the low-side switch to be closed based on the switch count rules.

Figure 9:
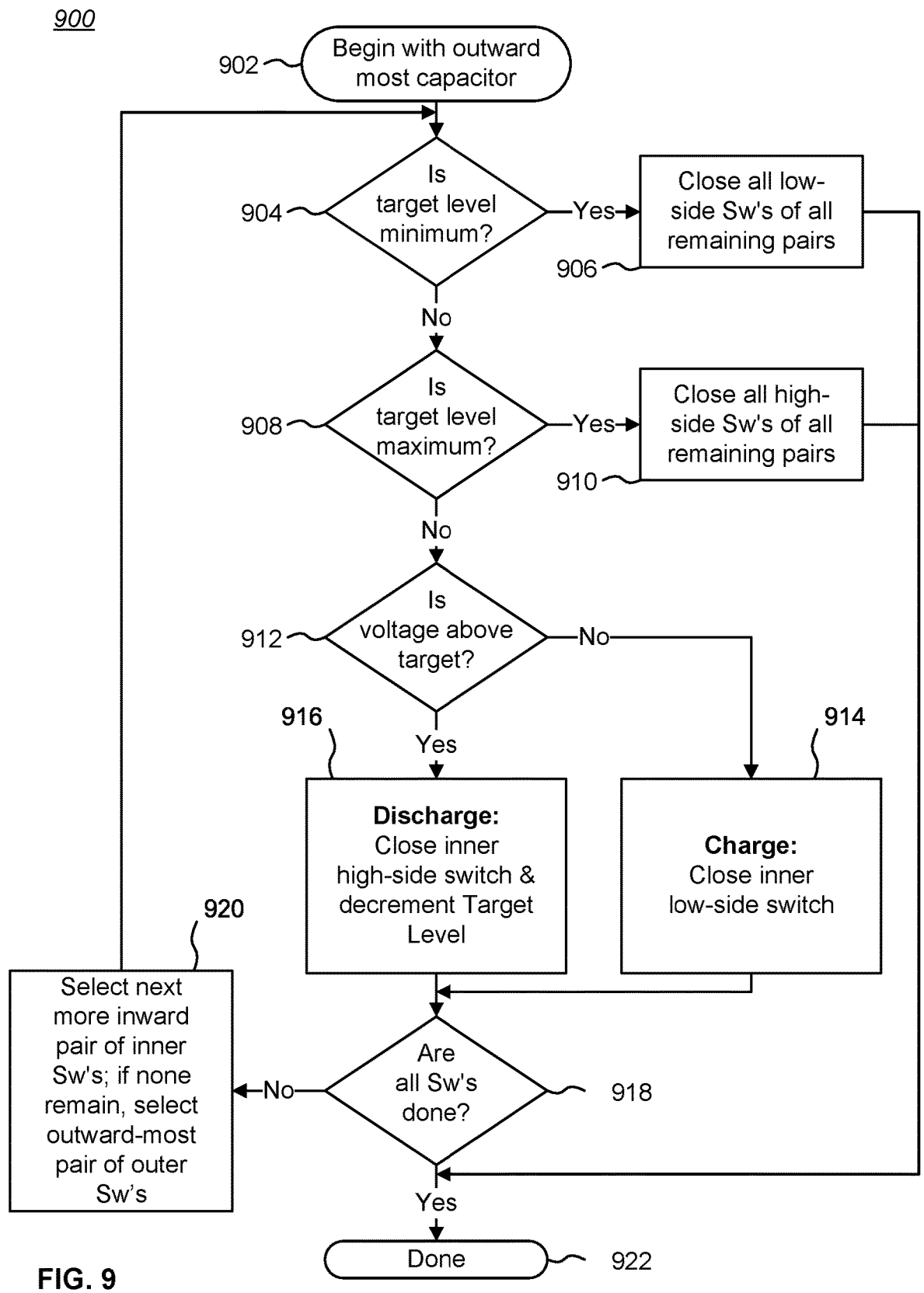
FIG. 9 is a more detailed flowchart of the Outward-In inner-switch method.

FIG. 9 is a more detailed flowchart 900 of the Outward-In inner-switch method. Beginning with the outward-most fly capacitor [Step 902], the Multi-Level Switch State Selector 514 determines if the Target Level is at the minimum [Step 904]; if so, the inner low-side switches of all remaining switch pairs in the converter circuit are set to be closed [Step 906] and the process is done [Step 922]. For the sake of brevity in the figure, "set to be closed" is shortened to "close", which is ultimately what occurs as or after the set of switch states is fully determined.

If the Target Level is not at the minimum [Step 904], the Multi-Level Switch State Selector 514 determines if the Target Level is at the maximum [Step 908]; if so, the inner high-side switches of all remaining switch pairs in the converter circuit are set to be closed [Step 910] and the process is done [Step 922]. Note that decision steps 904 and 908 may be performed in either order.

If the Target Level is not at the maximum [Step 908], the Multi-Level Switch State Selector 514 determines if the voltage across the current fly capacitor is above Vtarget for that fly capacitor [Step 912]; if not, then the inner low-side switch controlled by the fly capacitor is set to be closed, which places that fly capacitor into a charge mode [Step 914]. Thereafter, processing continues at Step 918.

If the voltage across the fly capacitor is not above Vtarget for that fly capacitor [Step 912], then the inner high-side switch controlled by the fly capacitor is set to be closed, which places that fly capacitor into a discharge mode; in addition, the Target Level is decremented [Step 916]. Thereafter, processing continues at Step 918.

A determination is made as to whether all switch pairs have had appropriate states set [Step 918]; if so, the process is done [Step 922], and if not, the next more-inward pair of inner switches are selected; if none remain, then select the pair of outward-most outer switches (S[2*x+1] and S [2*x+2]) [Step 920] and the process loops to Step 904.

The Outward-In inner-switch method allows arbitrary transitions from any Level to other Level while preserving the charge-balance of the fly capacitor Cx. In addition, this method is able to deal with line and load transients while automatically rebalancing capacitors as may be needed. Another advantage of this method is ease of implementation: the method is as simple as sensing the voltage across each fly capacitor and comparing that voltage to the target voltage for that fly capacitor in order to decide the state of the switches associated with that fly capacitor.

B. Inward-Out Methods

Inward-Out methods apply the generalized capacitor control method starting with the inward-most fly capacitor (C1 in FIG. 4A) of an M-level converter circuit and sequentially working toward the outward-most fly capacitor (C[M−2] in FIG. 4A). Thus, Inward-Out methods give priority to the inward fly capacitors—that is, the inward fly capacitors are given the first opportunity to set their controlled switches to a charging or discharging state.

There are two variants of the Inward-Out method: an inner-switch method in which each fly capacitor Cx controls its inner set of switches, and an outer-switch method in which each fly capacitor Cx controls its outer set of switches.

(1) Inward-Out Inner-Switch Method

In the Inward-Out inner-switch method, if multiple capacitors set the same state in a row, this variant will result in the last capacitor (outward-most) in the sequence being charged or discharged.

Keeping in mind the switch count rules, the following general Inward-Out inner-switch method applies for each switching cycle of an M-level converter circuit:

Step 1) Select the inward-most fly capacitor that has not been considered yet (thus, start with fly capacitor C1);

Step 2) If the voltage of the selected fly capacitor is above its Vtarget AND the number of high-side switches for all more-outward fly capacitors has not been exhausted THEN set the inner high-side switch of the selected fly capacitor to be closed to discharge the selected fly capacitor; ELSE, since the voltage of the selected fly capacitor is below its Vtarget, set the inner low-side switch of the selected fly capacitor to be closed to charge the selected fly capacitor;

Step 3) Loop to Step 1 until all fly capacitors have been selected;

Step 4) For the remaining pair of left-over outward-most outer switches (S [2*x+1] and S [2*x+2]), set the high-side switch or the low-side switch to be closed based on the switch count rules.

The simplified form of keeping track of how many high-side or low-side switches have been set to be closed or opened and knowing when the limit of total switches has been reached shown above for the Outward-In methods is not usable here. A slightly more generalized counter may be used. The key difference is that in the Outward-In methods, a decision was made in each step solely based on knowledge of that step's own structure or substructure and position in the multi-level converter circuit without needing to know the whole structure. This is useful for modular expansion—a single unit may be created that can be chained to any degree to create any M-level converter. However, for the Inward-Out methods, the final Target Level voltage and the total size (number of substructures) of the converter circuit (starting at the most inner capacitor substructure) needs to be known beforehand.

As one example, the accounting of switches in a converter circuit can be implemented using two counters initially based on two values, M and L:

M=total number of levels in the converter circuit

L=Target Level (the level the multi-level converter circuit needs to output, such as $V_{IN}/4$, as the starting level for the control algorithm; the Target Level may adjust as necessary per the accounting method below)

The accounting method may include the following steps:

A) Initialize the two counters:
Set a High-Side switch counter to L−1.
Set a Low-Side switch counter to M−L.

B) Every time a low-side switch is selected to be set to a closed state, the Low-Side switch counter is decremented.

C) Every time a high-side switch is selected to be set to a closed state, the High-Side switch counter is decremented.

D) If the High-Side switch counter reaches 0, all remaining pairs of switches must select the low-side switch to be set to a closed state.

E) If the Low-Side switch counter reaches 0, all remaining pairs of switches must select the high-side switch to be set to a closed state.

Figure 10:
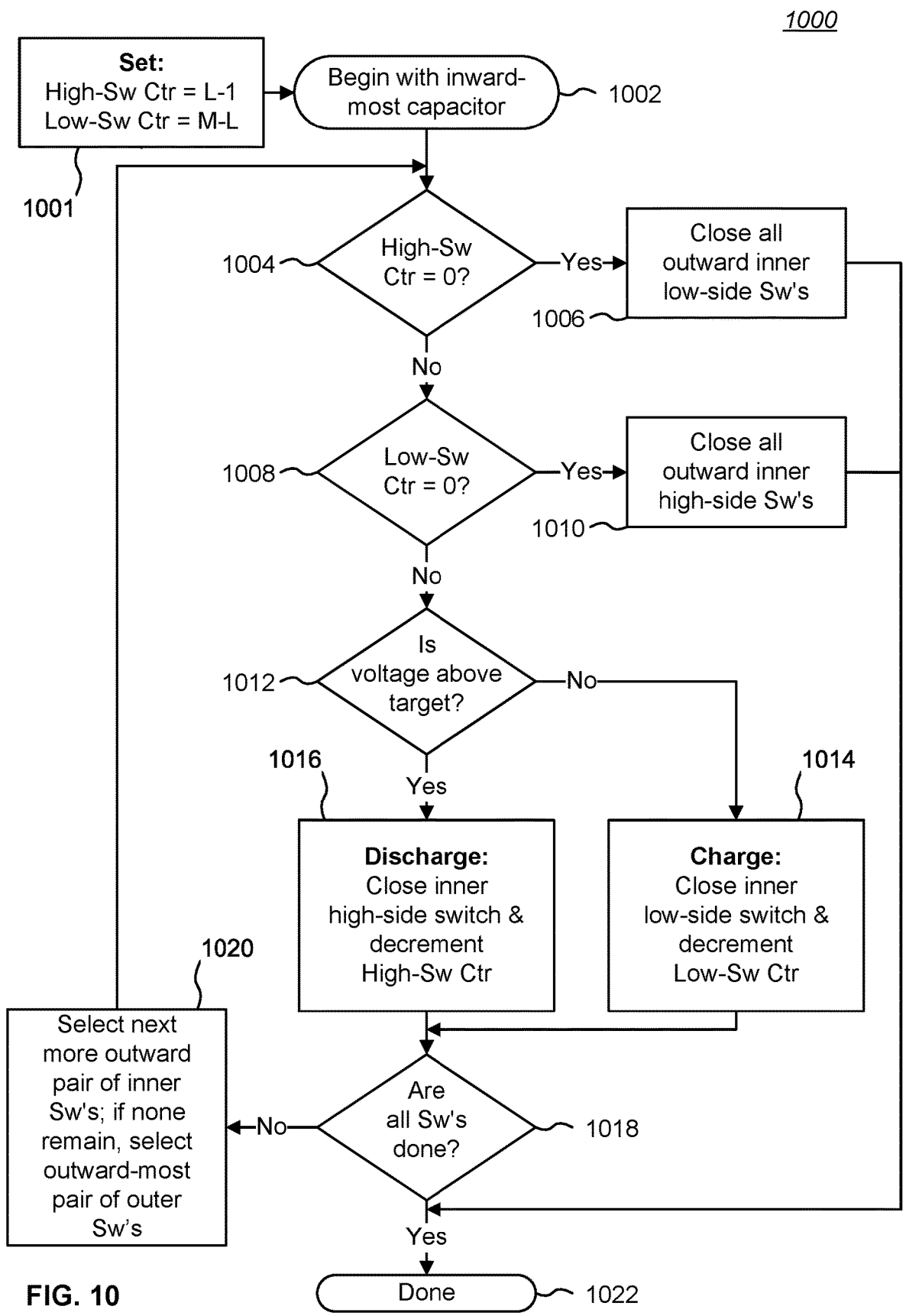
FIG. 10 is a more detailed flowchart of the Inward-Out inner-switch method.

FIG. 10 is a more detailed flowchart 1000 of the Inward-Out inner-switch method. Set the High-Side switch counter ("High-Sw Ctr") to L−1 and the Low-Side switch counter ("Low-Sw Ctr") to M−L [Step 1001]. Then begin with the inward-most fly capacitor [Step 1002]. Note that steps 1001 and 1002 may be reversed in order.

If High-Sw Ctr=0 [Step 1004], then set all remaining outward inner low-side switches to be closed [Step 1006] and the process is done [Step 1022]. Otherwise, if Low-Sw Ctr=0 [Step 1008], then set all remaining outward inner high-side switches to be closed [Step 1010] and the process is done [Step 1022]. Note that decision steps 1004 and 1008 may be performed in either order. For the sake of brevity in the figure, "set to be closed" is shortened to "close", which is ultimately what occurs as or after the set of switch states is fully determined.

If Low-Sw Ctr≠0 [Step 1008], then determine if the voltage across the fly capacitor is above Vtarget for that fly capacitor [Step 1012]; if not, then set the inner low-side switch controlled by the fly capacitor to be closed, which places that fly capacitor into a charge mode; in addition, decrement the Low-Sw Ctr by one [Step 1014]. Thereafter, processing continues at Step 1018.

If the voltage across the fly capacitor is above Vtarget for that fly capacitor [Step 1012], then set the inner high-side switch controlled by the fly capacitor to be closed, which places that fly capacitor into a discharge mode; in addition, decrement the High-Sw Ctr by one [Step 1016]. Thereafter, processing continues at Step 1018.

A determination is made as to whether all switch pairs have had appropriate states set [Step 1018]; if so, the process is done [Step 1022], and if not, the next more-outward pair of inner switches are selected; if none remain, then select the pair of outward-most outer switches (S [2*x+1] and S [2*x+2]) [Step 1020] and the process loops to Step 1004.

This method is very similar to the Outward-In inner-switch method with a key difference of keeping two counters going: one for high-side switches and one for low-side switches.

(1) Inward-Out Outer-Switch Method

In the Inward-Out outer-switch method, if multiple capacitors set the same state in a row, this variant will result in the first capacitor (inward-most) in the sequence being charged or discharged.

Keeping in mind the switch count rules, the following general Inward-Out inner-switch method applies for each switching cycle of an M-level converter circuit:

Step 1) Select the inward-most fly capacitor that has not been considered yet;

Step 2) If the voltage of the selected fly capacitor is above its Vtarget AND the number of low-side switches for all more-outward fly capacitors has not been exhausted THEN set the outer low-side switch of the selected fly capacitor to be closed to discharge the selected fly capacitor; ELSE, since the voltage of the selected fly capacitor is below its Vtarget, set the outer high-side switch of the selected fly capacitor to be closed to charge the selected fly capacitor;

Step 3) Loop to Step 1 until all fly capacitors have been selected;

Step 4) For the remaining pair of left-over inward-most inner switches (S1 and S2), set the high-side switch or the low-side switch to be closed based on the switch count rules.

The accounting method for tracking how many high-side or low-side switches have been closed or opened and knowing when the limit of total switches has been reached will be identical to the Inward-Out inner-switch accounting method. The only difference is moving the inward-most switches to be considered last. Thus, the accounting method may include the following steps:

A) Initialize the two counters:
Set a High-Side switch counter to L−1.
Set a Low-Side switch counter to M−L.

B) Every time a low-side switch is selected to be set to a closed state, the Low-Side switch counter is decremented.

C) Every time a high-side switch is selected to be set to a closed state, the High-Side switch counter is decremented.

D) If the High-Side switch counter reaches 0, all remaining pairs of switches must select the low-side switch to be set to a closed state.

E) If the Low-Side switch counter reaches 0, all remaining pairs of switches must select the high-side switch to be set to a closed state.

Figure 11:
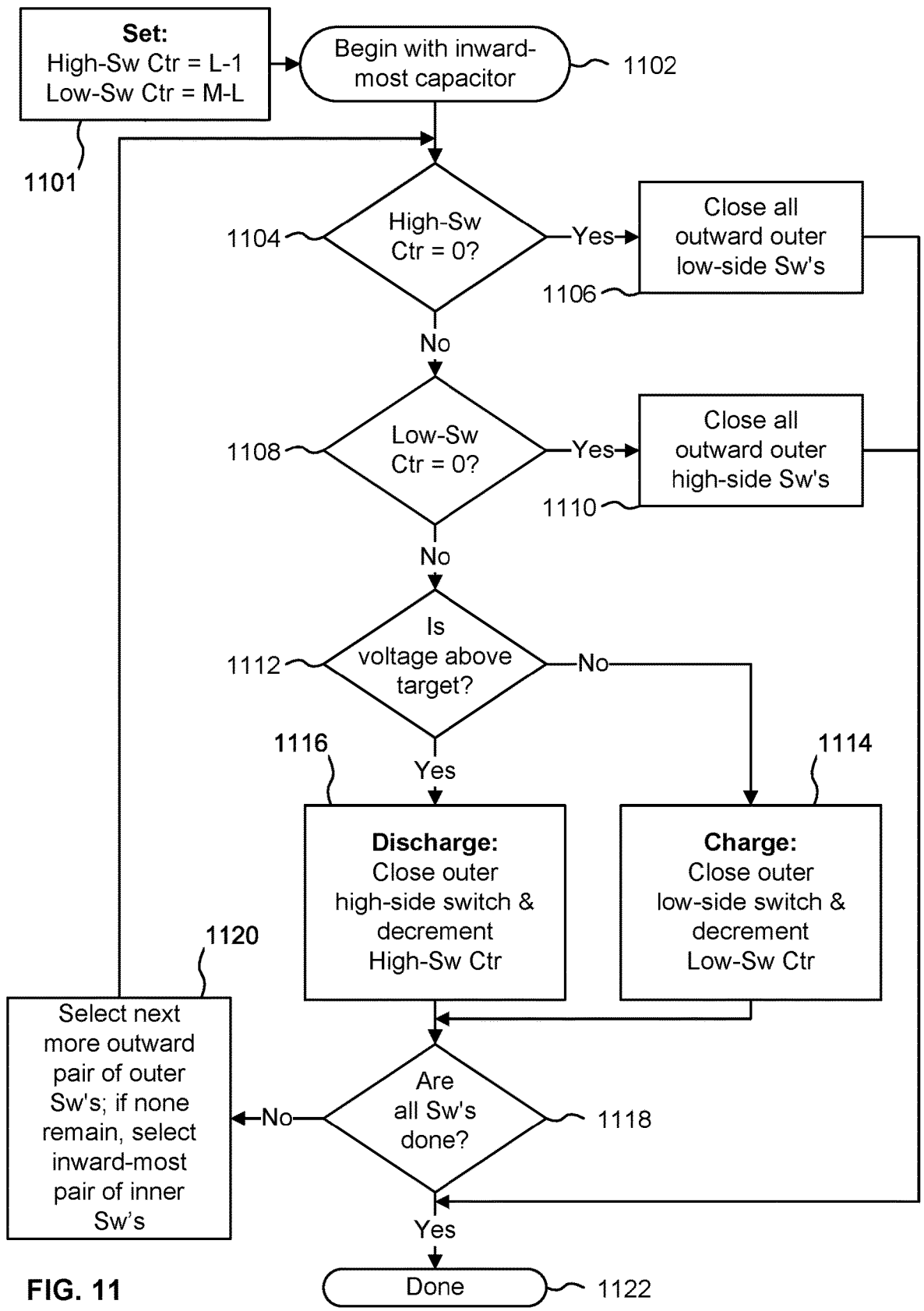
FIG. 11 is a more detailed flowchart of the Inward-Out outer-switch method.

FIG. 11 is a more detailed flowchart 1100 of the Inward-Out outer-switch method. Set the High-Side switch counter ("High-Sw Ctr") to L−1 and the Low-Side switch counter ("Low-Sw Ctr") to M−L [Step 1101]. Then begin with the inward-most fly capacitor [Step 1102]. Note that steps 1101 and 1102 may be reversed in order.

If High-Sw Ctr=0 [Step 1104], then set all remaining outward outer low-side switches to be closed [Step 1106] and the process is done [Step 1122]. Otherwise, if Low-Sw Ctr=0 [Step 1108], then set all remaining outward outer high-side switches to be closed [Step 1110] and the process is done [Step 1122]. Note that decision steps 1104 and 1108 may be performed in either order. For the sake of brevity in the figure, "set to be closed" is shortened to "close", which is ultimately what occurs as or after the set of switch states is fully determined.

If Low-Sw Ctr 0 [Step 1108], then determine if the voltage across the fly capacitor is above Vtarget for that fly capacitor [Step 1112]; if not, then set the outer low-side switch controlled by the fly capacitor to be closed, which places that fly capacitor into a charge mode; in addition, decrement the Low-Sw Ctr [Step 1114]. Thereafter, processing continues at Step 1118.

If the voltage across the fly capacitor is above Vtarget for that fly capacitor [Step 1112], then set the outer high-side switch controlled by the fly capacitor to be closed, which places that fly capacitor into a discharge mode; in addition, decrement the High-Sw Ctr [Step 1116]. Thereafter, processing continues at Step 1118.

A determination is made as to whether all switch pairs have had appropriate states set [Step 1118]; if so, the process is done [Step 1122], and if not, the next more-outward pair of outer switches are selected; if none remain, then select the pair of inward-most inner switches (S1, S2) [Step 1120] and the process loops to Step 1104.

C. Priority First Methods

With a double-counter accounting method as described above, the fly capacitors Cx do not need to be considered in strict order. A quite useful alternative method is to prioritize the fly capacitors based on how far each is from its target voltage, Vtarget, thus prioritizing the most imbalanced fly capacitors first for more robust system behavior.

One Priority-Based outer-switch method follows:

Step 1) Select the highest priority fly capacitor that has not been considered yet (i.e., the fly capacitor with a measured voltage that has the largest delta from that fly capacitors Vtarget);

Step 2) If the voltage of the selected fly capacitor is above its Vtarget AND the number of low-side switches for all other fly capacitors has not been exhausted THEN set the outer low-side switch of the selected fly capacitor to be closed to discharge the selected fly capacitor; ELSE, since the voltage of the selected fly capacitor is below its Vtarget, set the outer high-side switch of the selected fly capacitor to be closed to charge the selected fly capacitor;

Step 3) Loop to Step 1 until all fly capacitors have been selected;

Step 4) For the remaining pair of left-over inward-most switches (S1 and S2), set the high-side switch or the low-side switch to be closed based on the switch count rules.

One Priority-Based inner-switch method follows:

Step 1) Select the highest priority fly capacitor that has not been considered yet (i.e., the fly capacitor with a measured voltage that has the largest delta from that fly capacitors Vtarget);

Step 2) If the voltage of the selected fly capacitor is above its Vtarget AND the number of high-side switches for all other fly capacitors has not been exhausted THEN set the inner high-side switch of the selected fly capacitor to be closed to discharge the selected fly capacitor; ELSE, since the voltage of the selected fly capacitor is below its Vtarget, set the inner low-side switch of the selected fly capacitor to be closed to charge the selected fly capacitor;

Step 3) Loop to Step 1 until all fly capacitors have been selected;

Step 4) For the remaining pair of left-over outward-most switches (S[2*x+1] and S [2*x+2]), set the high-side switch or the low-side switch to be closed based on the switch count rules.

There is one problem that may arise with either Priority-Based method: the highest-priority capacitor may result in it being bypassed by the switch state choices of the next more-inward capacitor (for the outer-switch method) or the next more-outward capacitor (for the inner-switch method). This potential issue can be resolved by modifying the above Priority-Based methods to create a Priority-Based dual-switch method as follows:

Step 1) Select the highest priority fly capacitor that has not been considered yet (i.e., the fly capacitor with a measured voltage that has the largest delta from that fly capacitor's Vtarget);

Step 2) Compare the voltage of the selected fly capacitor to its Vtarget:

A) If DISCHARGE is required, then:

1) If the high-side switch counter is >0 and the inner switches of that fly capacitor has not been set, then set the inner high-side switch;
2) If the low-side switch counter is >0 and outer switches of that fly capacitor have not been set, then set the outer low-side switch;

B) If CHARGE is required, then:

1) If the low-side switch counter is >0 and the inner switches of that fly capacitor has not been set, then set the inner low-side switch;
2) If the high-side switch counter is >0 and outer switches of that fly capacitor have not been set, then set the outer high-side switch;

C) If BYPASS is required (e.g., when the top or bottom switch counter has reached a limit), then:

1) If the high-side switch counter is =0, then set all remaining low-side switches to be closed;
2) If the low-side switch counter=0, then set all remaining high-side switches to be closed;

Step 3) Loop to Step 1 until all fly capacitors have been selected;

Step 4) If the remaining pair of left-over switches has not been set, then set the high-side switch or the low-side switch to be closed based on the switch count rules.

In essence, this method changes both inner and outer switches for priority capacitors to ensure they generally will get charged or discharged as necessary, avoiding bypassing when possible.

D. Advanced Methods

With the ability to always move the fly capacitors of a converter circuit towards charge-balance, transitions from level-to-level can be made without further restrictions, which opens up a number of possibilities for adding advanced methods. When selecting a voltage Target Level for a converter circuit, two general rules are followed: (1) for steady-state operations, the Target Level voltage closest to $V_{OuT}$ that either charges or discharges the inductor L is selected for efficiency, and (2) for transient response, a Target Level that is higher (for charging) or lower (for discharging) than the closest Target Level is selected to quickly charge or discharge the inductor L. However, in alternative embodiments, it may be beneficial to add additional logic to jump to a different Target Level to resolve a dynamic or operational issue with a converter circuit. Following are four examples of such methods, any or all of which may be implemented in the Voltage Level Selector 512 of FIG. 5.

(1) Advanced Method 1— Level Jumps Based on Inductor Voltage Drop

Referring to FIG. 4A, the inductor L needs a desired minimum voltage drop to quickly charge/discharge the inductor in order not to impact loop response. If $V_{OuT}$ approaches a voltage close to or at the boundary between adjacent Levels of the converter circuit, the converter cell 400 reaches a "dead-zone" where there is not enough drop across the inductor L to meet transients. Therefore, it is beneficial to select the voltage Target Level closest to $V_{OuT}$ that also meets or exceeds the desired minimum voltage drop, bypassing the closest voltage Target Level if that level does not meet the minimum requirements. The result is that, as the $V_{OuT}$ approaches a boundary of a level, the controller can automatically jump to the next Target Level.

Figure 12:
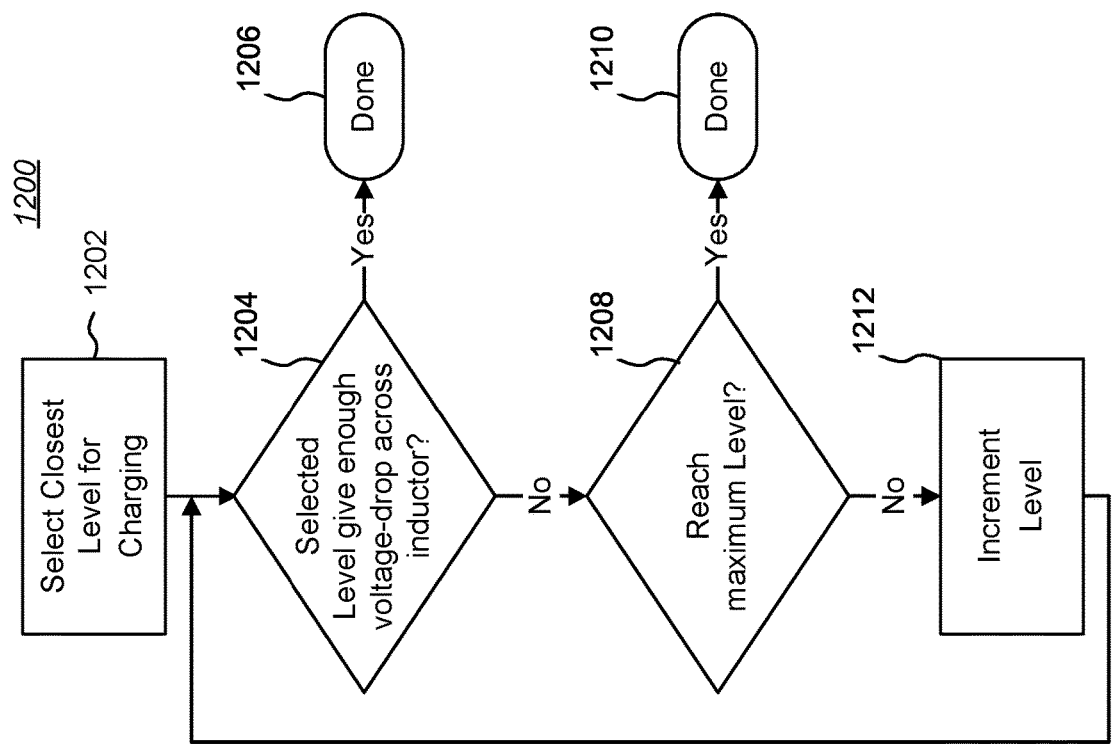
FIG. 12 is a flow chart shows a method of determining when to jump to a higher level based on inductor voltage drop.

FIG. 12 is a flow chart 1200 shows a method of determining when to jump to a higher Target Level based on inductor voltage drop. When the Voltage Level Selector 512 selects a closest Target Level for a desired $V_{OuT}$ [Step 1202], that Target Level is evaluated as to whether it will give a desired voltage-drop across the inductor L [Step 1204]; if yes, the process is done [Step 1206]. Otherwise, a determination is made as to whether the maximum Target Level for the converter circuitry has been reached [Step 1208]; if so, the process is done [Step 1210].

If the maximum Target Level for the converter circuitry has not been reached [Step 1208], then the selected Target Level is incremented [Step 1212] and the process loops to Step 1204 until done.

Figure 13:
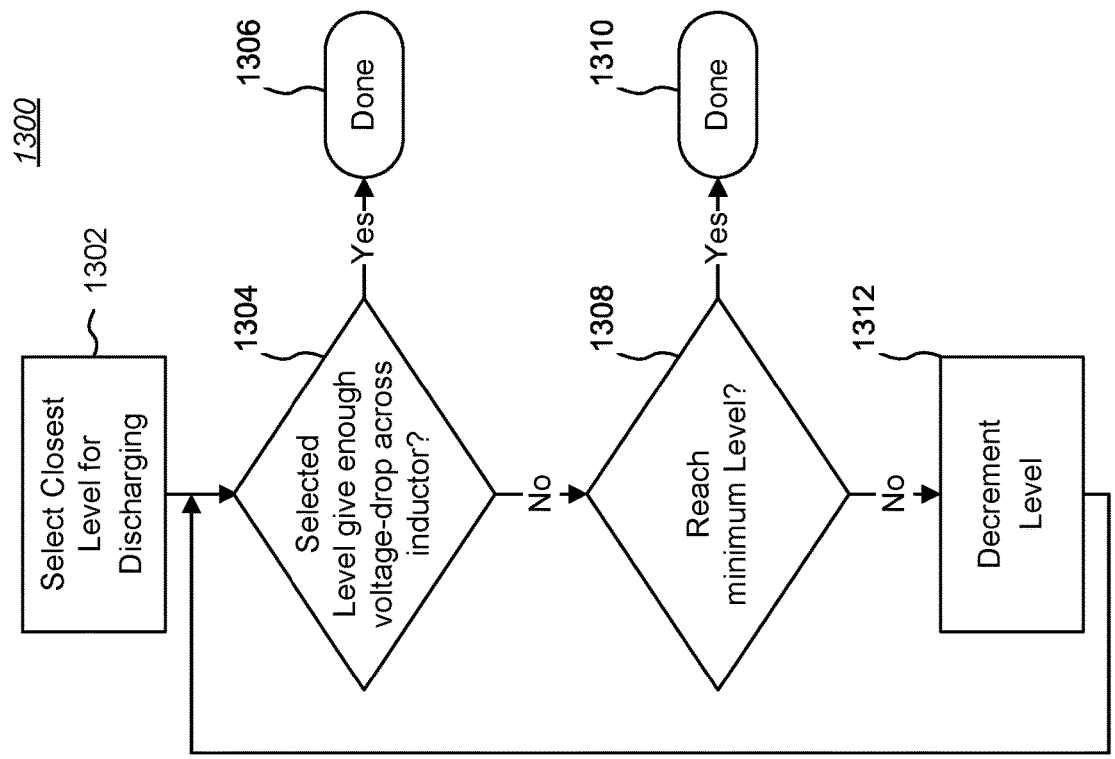
FIG. 13 is a flow chart shows a method of determining when to jump to a lower level based on inductor voltage drop.

FIG. 13 is a flow chart 1300 shows a method of determining when to jump to a lower Target Level based on inductor voltage drop. When the Voltage Level Selector 512 selects a closest Target Level for a desired $V_{OuT}$ [Step 1302], that Target Level is evaluated as to whether it will give a desired voltage-drop across the inductor L [Step 1304]; if yes, the process is done [Step 1306]. Otherwise, a determination is made as to whether the minimum Target Level for the converter circuitry has been reached [Step 1308]; if so, the process is done [Step 1310].

If the minimum Target Level for the converter circuitry has not been reached [Step 1308], then the selected Target Level is decremented [Step 1312] and the process loops to Step 1304 until done.

(2) Advanced Method 2— Level Jumps Based on Load Transients

If the feedback controller (see FIG. 5) detects a sudden load-step or load release, it can pro-actively request selection of a higher or lower Target Level than the closest Target Level to improve inductor slewing speed. The feedback controller may detect output dV/dT to indirectly sense sudden output current change. Alternatively, the feedback controller may measure output current directly using current sensing techniques. When an output change exceeds desired levels, the Voltage Level Selector 512 can then select higher or lower Target Levels (depending on whether a load step or load release has been sensed). The result is that the slew rate for the inductor L increases during large output load transients, allowing for fast response yet still preserving steady-state efficiency.

Figure 14:
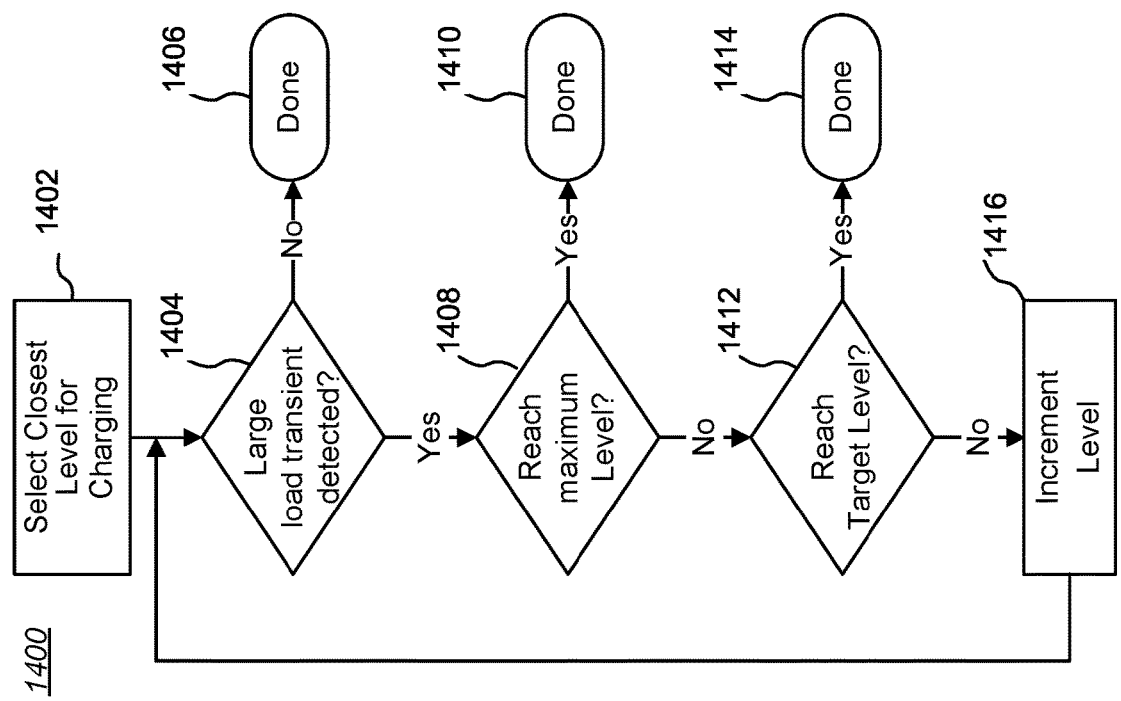
FIG. 14 is a flow chart shows a method of determining when to jump to a higher level based on load transients.

FIG. 14 is a flow chart 1400 shows a method of determining when to jump to a higher Target Level based on load transients. When the Voltage Level Selector 512 selects a closest Target Level for a desired $V_{OuT}$ [Step 1402], a determination is made as to whether a large load transient (increase or decrease) has been detected [Step 1404]; if not, the process is done [Step 1406]. Otherwise, a determination is made as to whether the maximum Target Level for the converter circuitry has been reached [Step 1408]; if so, the process is done [Step 1410].

If the maximum Target Level for the converter circuitry has not been reached [Step 1408], then a determination is made as to whether a selected Target Level has been reached (e.g., the voltage drop measured across the inductor L reaches a target voltage level) [Step 1412]; if yes, the process is done [Step 1414]. Otherwise, the selected Target Level is incremented [Step 1416] and the process loops to Step 1404 until done.

Figure 15:
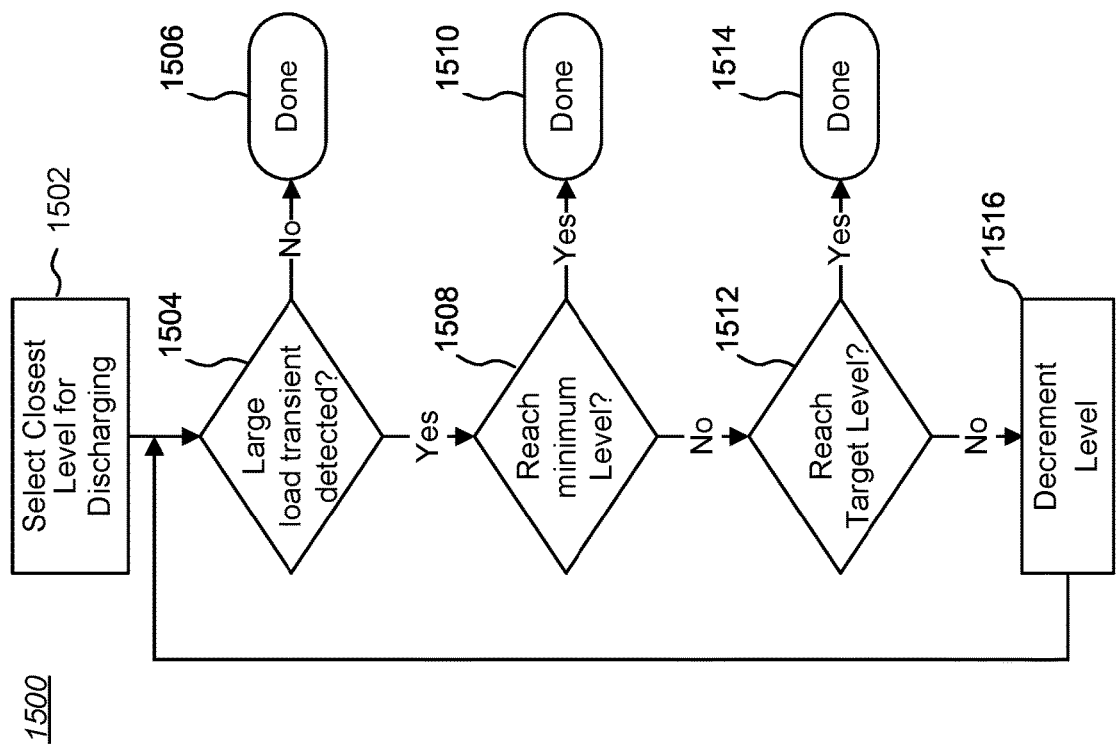
FIG. 15 is a flow chart shows a method of determining when to jump to a lower level based on load transients.

FIG. 15 is a flow chart 1500 shows a method of determining when to jump to a lower Target Level based on load transients. When the Voltage Level Selector 512 selects a closest Target Level for a desired $V_{OuT}$ [Step 1502], a determination is made as to whether a large load transient (increase or decrease) has been detected [Step 1504]; if not, the process is done [Step 1506]. Otherwise, a determination is made as to whether the minimum Target Level for the converter circuitry has been reached [Step 1508]; if so, the process is done [Step 1510].

If the minimum Target Level for the converter circuitry has not been reached [Step 1508], then a determination is made as to whether a selected Target Level has been reached [Step 1512]; if yes, the process is done [Step 1514]. Otherwise, the selected Target Level is incremented [Step 1516] and the process loops to Step 1504 until done.

(3) Advanced Method 3— Level Jumps Based on Output Deviations

If the output voltage $V_{OuT}$ or output current differs from a target error value, a higher or lower Target Level can be selected. The selected Target Level can be proportional to the error. For example, if the output voltage is off by a small amount, then the next higher Target Level than the closest Target Level can be selected. If the output voltage differs from a target error value by a lot, then several Target Levels may be bypassed (up or down) to more rapidly reduce the error. As a result, as the output voltage or current deviates from a desired target, higher or lower Target Levels than the closest Target Level may be selected to help alleviate the problem. The number of Target Levels to bypass can be a function of the error magnitude.

Figure 16:
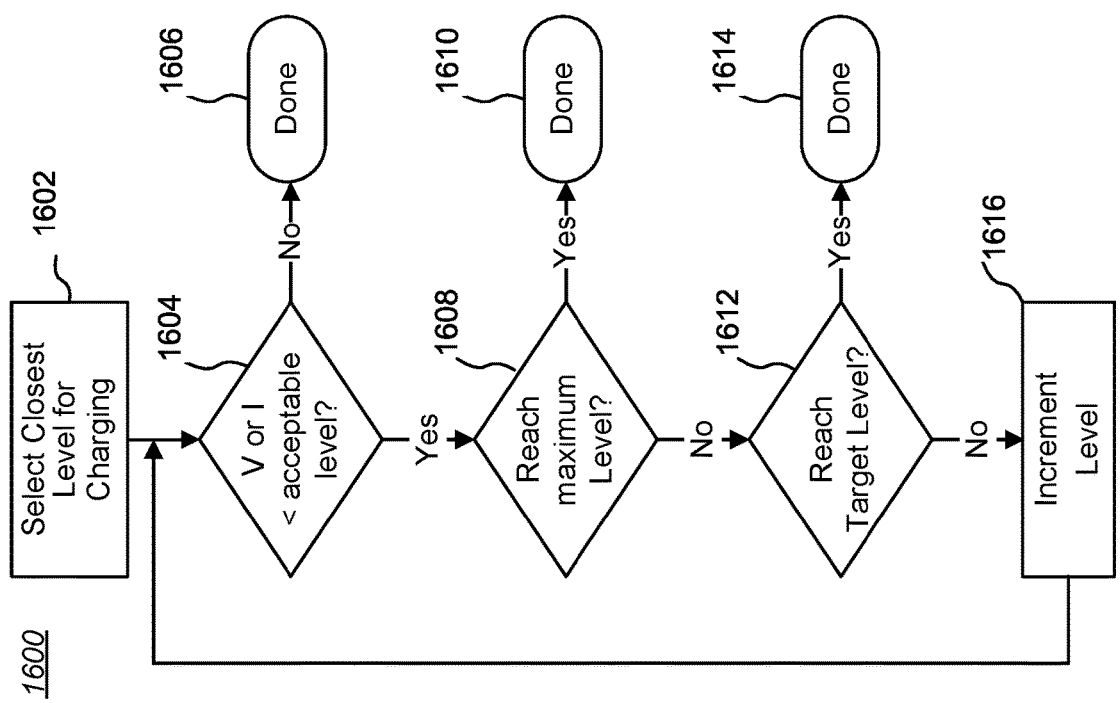
FIG. 16 is a flow chart shows a method of determining when to jump to a higher level based on output deviations.

FIG. 16 is a flow chart 1600 shows a method of determining when to jump to a higher Target Level based on output deviations. When the Voltage Level Selector 512 selects a closest Target Level for a desired $V_{OuT}$ [Step 1602], a determination is made as to whether the output voltage V or current I is less than an acceptable level for the particular application [Step 1604]; if not, the process is done [Step 1606]. Otherwise, a determination is made as to whether the maximum Target Level for the converter circuitry has been reached [Step 1608]; if so, the process is done [Step 1610].

If the maximum Target Level for the converter circuitry has not been reached [Step 1608], then a determination is made as to whether a selected Target Level has been reached [Step 1612]; if yes, the process is done [Step 1614]. Otherwise, the selected Target Level is incremented [Step 1612] and the process loops to Step 1604 until done.

Figure 17:
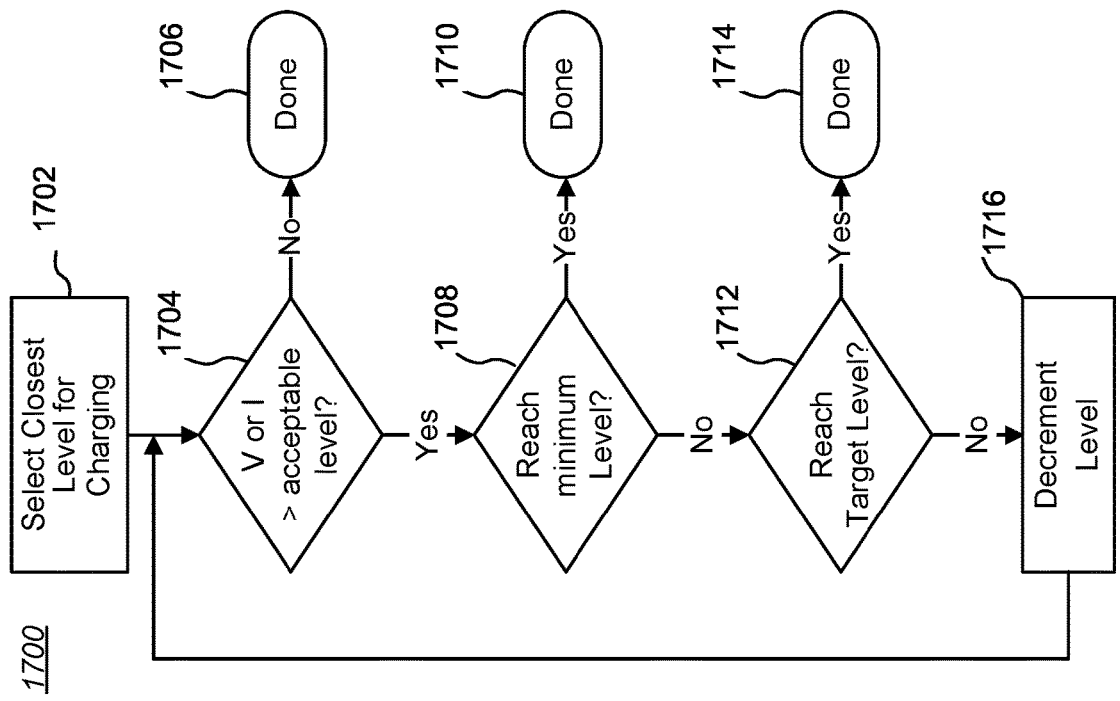
FIG. 17 is a flow chart shows a method of determining when to jump to a lower level based on output deviations.

FIG. 17 is a flow chart 1700 shows a method of determining when to jump to a lower Target Level based on output deviations. When the Voltage Level Selector 512 selects a closest Target Level for a desired $V_{OuT}$ [Step 1702], a determination is made as to whether the output voltage V or current I is greater than an acceptable level for the particular application [Step 1704]; if not, the process is done [Step 1706]. Otherwise, a determination is made as to whether the minimum Target Level for the converter circuitry has been reached [Step 1708]; if so, the process is done [Step 1710].

If the minimum Target Level for the converter circuitry has not been reached [Step 1708], then a determination is made as to whether a selected Target Level has been reached [Step 1412]; if yes, the process is done [Step 1614]. Otherwise, the selected Target Level is decremented [Step 1712] and the process loops to Step 1704 until done.

(4) Advanced Method 3— Level Jumps Based on Input Signals

As may be appreciated, a converter circuit embodiment of the inventive concepts is generally part of a large electronic system and may be tailored for particular applications. Accordingly, in some applications, it may be useful for the Target Level that might be selected by the Voltage Level Selector 512 of a converter circuit to be overridden by application of an input signal. For example, it may be known by other circuitry in a system that a large transient event is to occur (e.g., that additional circuits in the system will be turned ON or OFF) and that accordingly the converter circuit can be forced to a higher slew rate for $V_{OUT}$. An input signal from such circuitry to the Voltage Level Selector 512 of a converter circuit can allow for selection of higher (for charging) or lower (for discharging) Target Levels ahead of any system changes that might be detectable by the converter circuit itself. For example, if a phone microcontroller is about to turn on a load (such as the display screen), the microcontroller can signal the multi-level converter circuit that a large load-step is about to occur. The multi-level converter circuit can then use a higher Target Level than otherwise would be required based on its own internal state and measurements to meet the transient response requirement.

Additional Control and Operational Considerations

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "*Apparatus and Method for Efficient Shutdown of Adiabatic Charge Pumps*", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "Startup Detection for Parallel Power Converters", assigned to the assignee of the present invention, the contents of which are incorporated by reference.

Another consideration in operating multi-level converter cells is attaining (i.e., pre-charging) and maintaining fly capacitor voltages that are essentially fully proportionally balanced so that all switches are subjected to a similar voltage stress, since unbalanced fly capacitors can lead to breakdown of a switch (particularly FET switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main switch that is part of a multi-level converter cell (in some cases, one switch-resistor pair may span two series-connected switches). This particular solution for pre-charging and/or balancing charge on fly capacitors is very fast, provides slow pre-charging of the fly capacitors during a pre-charge period, protects switches from in-rush current, and provides stable voltages for converter cell switches. Details of this solution, as well as alternative pre-charging and charge balancing solutions, are taught in U.S. Pat. No. 10,720,843, issued Jul. 21, 2020, entitled "*Multi-Level DC-DC Converter with Lossy Voltage Balancing*", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "*Multi-Level DC-DC Converter with Lossless Voltage Balancing*", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "*Multi-Level DC-DC Converter with Boundary Transition Control*", assigned to the assignee of the present invention, the contents of which are incorporated by reference.

Yet another consideration for some embodiments is protection of the main power switches and other components within a power converter from stress conditions, particular from voltages that exceed the breakdown voltage of such switches (particularly FET switches). One means for protecting a multi-level power converter uses at least one high-voltage FET switch while allowing all or most other main power switches to be low-voltage FET switches.

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

As should be clear, the multi-level power converter embodiments described in this disclosure may be synergistically combined with the teachings of one or more of the additional control and operational circuits and methods described in this section.

General Benefits and Advantages of Multi-Level Power Converters

Embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

More particularly, multi-level power converters provide or enable numerous benefits and advantages, including:
  adaptability to applications in which input and/or output voltages may have a wide dynamic-range (e.g., varying battery input voltage levels, varying output voltages);
  efficiency improvements on the run-time of devices operating on portable electrical energy sources (batteries, generators or fuel cells using liquid or gaseous fuels, solar cells, etc.);
  efficiency improvements where efficiency is important for thermal management, particularly to protect other components (e.g., displays, nearby ICs) from excessive heat;
  enabling design optimizations for power efficiency, power density, and form-factor of the power converter—for example, smaller-size multi-level power converters may allow placing power converters in close proximity to loads, thus increasing efficiency, and/or to lower an overall bill of materials;
  the ability to take advantage of the performance of smaller, low voltage transistors;
  adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);
  adaptability to applications in which loads may vary widely, such as ICs in general (including microprocessors and memory ICs), electrical motors and actuators, transducers, sensors, and displays (e.g., LCDs and LEDs of all types);
  the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, and WiFi (e.g., 802.11a, b, g, ac, ax), as well as other radio communication standards and protocols.

Programmable Embodiments

Some or all aspects of the invention, particularly the Multi-Level Switch State Selector 514 of FIG. 5, may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code may be applied to input data to perform the functions described in this disclosure and generate output information. The output information may be applied to one or more output devices in known fashion.

Each such computer program may be implemented in any desired computer language (including machine, assembly, or high-level procedural, logical, or object-oriented programming languages) to communicate with a computer system, and may be implemented in a distributed manner in which different parts of the computation specified by the software are performed by different computers or processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently or permanently), the storage media or device being readable by a general or special purpose programmable computer or processor for configuring and operating the computer or processor when the storage media or device is read by the computer or processor to perform the procedures described above. The inventive system may also be considered to be implemented as a non-transitory computer-readable storage medium, configured with a computer program, where the storage medium so configured causes a computer or processor to operate in a specific or predefined manner to perform the functions described in this disclosure.

Fabrication Technologies & Options

In various embodiments of multi-level power converters, it may be beneficial to use specific types of capacitors, particularly for the fly capacitors. For example, it is generally useful for such capacitors to have low equivalent series resistance (ESR), low DC bias degradation, high capacitance, and small volume. Low ESR is especially important for multi-level power converters that incorporate additional switches and fly capacitors to increase the number of voltage levels. Selection of a particular capacitor should be made after consideration of specifications for power level, efficiency, size, etc. Various types of capacitor technologies may be used, including ceramic (including multi-layer ceramic capacitors), electrolytic capacitors, film capacitors (including power film capacitors), and IC-based capacitors. Capacitor dielectrics may vary as needed for particular applications, and may include dielectrics that are paraelectric, such as silicon dioxide ($SiO_2$), hafnium dioxide ($HFO_2$), or aluminum oxide $Al_2O_3$. In addition, multi-level power converter designs may beneficially utilize intrinsic parasitic capacitances (e.g., intrinsic to the power FETs) in conjunction with or in lieu of designed capacitors to reduce circuit size and/or increase circuit performance. Selection of capacitors for multi-level power converters may also take into account such factors as capacitor component variations, reduced effective capacitance with DC bias, and ceramic capacitor temperature coefficients (minimum and maximum temperature operating limits, and capacitance variation with temperature).

Similarly, in various embodiments of multi-level power converters, it may be beneficial to use specific types of inductors. For example, it is generally useful for the inductors to have low DC equivalent resistance, high inductance, and small volume.

The controller(s) used to control startup and operation of a multi-level power converter may be implemented as a microprocessor, a microcontroller, a digital signal processor (DSP), register-transfer level (RTL) circuitry, and/or combinatorial logic.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOS- FET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method of setting output level and charge-balancing a set of fly capacitors during a switching cycle of a multi-level converter circuit that includes (1) a set of switches configured to be serially coupled between a first terminal and a second terminal, and (2) the set of fly capacitors each fly capacitor being coupled between a pair of low-side switches among the set of switches and between a pair of high-side switches among the set of switches, the method including:
    (a) selecting one fly capacitor among the set of fly capacitors that has not previously been selected;
    (b) if a voltage on the selected fly capacitor is above an associated target voltage and there are remaining low-side or high-side switches among the set of switches that are currently closable to enable a discharge path for the selected fly capacitor, then (1) setting the remaining low-side or high-side switches that enable the discharge path for the selected fly capacitor to a closed state, and otherwise (2) setting the remaining low-side or high-side switches that enable a charging path for the selected fly capacitor to a closed state;
    (c) looping to step (a) until all fly capacitors among the set of fly capacitors have been selected; and
    (d) for a remaining pair of left-over switches among the set of switches, setting an associated high-side switch or an associated low-side switch among the set of switches to a closed state based on a set of switch count rules, wherein the multi-level converter circuit has M total levels and the set of switch count rules for a level m of the multi-level converter circuit includes:
        (a) M−m low-side switches among the set of switches must be closed;
        (b) m−1 high-side switches among the set of switches must be closed; and
        (c) low-side switches and high-side switches among the set of switches that are not required to be closed must be open.

2. The method of claim 1, further including: when setting the remaining switches among the set of switches that enable the discharge path for the selected fly capacitor, decrementing the number of low-side switches among the set of switches that are closed and the number of high-side switches among the set of switches that are closed.

3. The method of claim 1, wherein the multi-level converter circuit further includes an output inductor, further including selecting the associated target level so to meet or exceed a desired minimum voltage drop across the output inductor.

4. The method of claim 1, further including setting the associated target level as a function of a detected load transient of the multi-level converter circuit.

5. The method of claim 1, further including setting the associated target level as a function of a deviation of an output voltage or current of the multi-level converter circuit from a desired target value.

6. The method of claim 1, further including setting the associated target level in response to an applied input signal.

7. A multi-level power converter including:
(a) a multi-level converter circuit including (i) a set of switches configured to be serially coupled between a first terminal and a second terminal, and (ii) a set of fly capacitors, each fly capacitor being coupled between a pair of low-side switches among the set of switches and between a pair of high-side switches among the set of switches, the multi-level converter circuit configured to receive an input voltage on the first terminal and produce an output voltage on an output terminal, wherein the output terminal is configured to be coupled to a first terminal of an inductor;
(b) a feedback controller coupled to a second terminal of the inductor and configured to produce a signal indicative of a voltage at the second terminal of the inductor;
(c) a multi-level controller coupled to the feedback controller and to the multi-level converter circuit, and configured to receive at least the signal from the feedback controller and a respective voltage status signal from the multi-level converter circuit corresponding to a respective fly capacitor among the set of fly capacitors, wherein the multi-level controller is configured to charge-balance each fly capacitor among the set of fly capacitors during a switching cycle of the multi-level converter circuit in response to the received signals by:
(1) selecting one fly capacitor among the set of fly capacitors that has not previously been selected;
(2) if a voltage on the selected fly capacitor is above an associated target voltage and there are remaining low-side or high-side switches among the set of switches that are currently closable to enable a discharge path for the selected fly capacitor, then (i) setting the remaining low-side or high-side switches that enable the discharge path for the selected fly capacitor to a closed state, and otherwise (ii) setting the remaining low-side or high-side switches that enable a charging path for the selected fly capacitor to a closed state;
(3) looping to step (c)(1) until all fly capacitors among the set of fly capacitors have been selected; and
(4) for a remaining pair of left-over switches among the set of switches, setting an associated high-side switch or an associated low-side switch among the set of switches to a closed state based on a set of switch count rules, wherein the multi-level converter circuit has M total levels and the set of switch count rules for a level m of the multi-level converter circuit includes:
(a) M−m low-side switches among the set of switches must be closed;
(b) m−1 high-side switches among the set of switches must be closed; and
(c) low-side switches and high-side switches among the set of switches that are not required to be closed must be open.

8. The multi-level power converter of claim 7, wherein the multi-level controller is further configured to decrement the number of low-side switches among the set of switches that are closed and the number of high-side switches among the set of switches that are closed when setting the switches that enable the discharge path for the selected fly capacitor.

9. The multi-level power converter of claim 7, wherein the multi-level controller is further configured to select the associated target level so to meet or exceed a desired minimum voltage drop across the inductor.

10. The multi-level power converter of claim 7, further including setting the associated target level as a function of a detected load transient of the multi-level converter circuit.

11. The multi-level power converter of claim 7, wherein the multi-level controller is further configured to set the associated target level as a function of a deviation of the output voltage or current of the multi-level converter circuit from a desired target value.

12. The multi-level power converter of claim 7, wherein the multi-level controller is further configured to set the associated target level in response to an applied input signal.

\* \* \* \* \*